United States Patent
Ostrum et al.

(10) Patent No.: US 12,544,986 B2
(45) Date of Patent: Feb. 10, 2026

(54) SYSTEM AND METHOD FOR REMOVAL OF SUPPORT MATERIAL OR RESIN FROM ADDITIVELY MANUFACTURED PARTS

(71) Applicant: PostProcess Technologies, Inc., Buffalo, NY (US)

(72) Inventors: Craig Ostrum, Buffalo, NY (US); Daniel Joshua Hutchinson, Orchard Park, NY (US); Daniel Fuglewicz, Getzville, NY (US); Anthony Wesley, Machias, NY (US); Robert Bosinski, West Seneca, NY (US); Bernd Gigas, Rochester, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 85 days.

(21) Appl. No.: 18/275,675

(22) PCT Filed: Feb. 8, 2022

(86) PCT No.: PCT/US2022/015606
§ 371 (c)(1),
(2) Date: Aug. 3, 2023

(87) PCT Pub. No.: WO2022/173731
PCT Pub. Date: Aug. 18, 2022

(65) Prior Publication Data
US 2024/0109257 A1 Apr. 4, 2024

Related U.S. Application Data

(60) Provisional application No. 63/216,036, filed on Jun. 29, 2021, provisional application No. 63/147,604, filed on Feb. 9, 2021.

(51) Int. Cl.
*B29C 64/00* (2017.01)
*B29C 64/35* (2017.01)
(Continued)

(52) U.S. Cl.
CPC .............. *B29C 64/40* (2017.08); *B29C 64/35* (2017.08); *B33Y 40/20* (2020.01); *B33Y 99/00* (2014.12)

(58) Field of Classification Search
CPC ............................... B29C 64/40; B33Y 99/00
See application file for complete search history.

(56) References Cited

U.S. PATENT DOCUMENTS 2,651,311 A * 9/1953 Rule ..................... A47L 15/08
134/194
10,112,344 B2 10/2018 Mcmahon et al.
(Continued)

OTHER PUBLICATIONS

International Search Report and Written Opinion of the International Searching Authority from International Patent Application No. PCT/US2022/015606, dated May 26, 2022, 11 pages.

*Primary Examiner* — Nicholas Krasnow
(74) *Attorney, Agent, or Firm* — Lempia Summerfield Katz LLC

(57) ABSTRACT

An apparatus and method are disclosed for removing support material or resin from additively manufactured parts. The apparatus includes a processing pump at least a portion of which is located in or adjacent to a processing tank filled with a liquid formulation suitable for removal of support material or resin from additively manufactured parts. The processing pump is adapted to create a vortex within the liquid formulation in the processing tank.

4 Claims, 18 Drawing Sheets

(51) Int. Cl.
*B29C 64/40* (2017.01)
*B33Y 40/20* (2020.01)
*B33Y 99/00* (2015.01)

(56) References Cited

U.S. PATENT DOCUMENTS

| | | |
|---|---|---|
| 10,737,440 B2 | 8/2020 | Hutchinson |
| 2004/0156262 A1* | 8/2004 | Roberts ................. B01F 25/104 |
| | | 366/136 |
| 2017/0036249 A1* | 2/2017 | Tafoya .................... B29C 64/35 |
| 2019/0176403 A1 | 6/2019 | Hutchinson |
| 2019/0344501 A1* | 11/2019 | Hutchinson ............ B33Y 40/20 |

\* cited by examiner

SYSTEM AND METHOD FOR REMOVAL OF SUPPORT MATERIAL OR RESIN FROM ADDITIVELY MANUFACTURED PARTS

CROSS-REFERENCE TO RELATED APPLICATION

The present patent document is a § 371 nationalization of PCT Application Serial No. PCT/US2022/015606, filed Feb. 8, 2022, designating the United States, which is hereby incorporated by reference, and this patent document also claims the benefit of the filing date under 35 U.S.C. § 119 (e) of U.S. Provisional Application Ser. No. 63/147,604, filed Feb. 9, 2021 and U.S. Provisional Application Ser. No. 63/216,036, filed Jun. 29, 2021, the entirety of all which are incorporated by reference herein and relied upon.

FIELD OF DISCLOSURE

The present disclosure pertains generally to a system and method for removing support material or resin from parts formed by additive manufacturing processes.

BACKGROUND OF THE DISCLOSURE

Additive manufacturing processes, such as 3D printing (e.g., Selective Laser Sintering (SLS), Stereolithography (SLA), fused deposition modeling (FDM), material jetting (MJ), electron beam (e-beam), etc.) provide significant advantages for many applications. Additive manufacturing processes enable the production of parts having complex geometries that would be difficult to make using traditional manufacturing techniques. Also, additive manufacturing processes enable the efficient production of low volumes of parts. However, some additive manufacturing processes produce parts that require removal of unwanted support material or resin. The support material or resin is produced during the printing portion of the additive manufacturing process. After the printing portion of the process is completed, the unwanted support material or resin must be removed before the additively manufactured part can be used for its intended purpose.

Various approaches exist for removing support material or resin from additively manufactured parts. These approaches include agitating the additively manufactured parts in a liquid media designed to erode and dissolve support material or resin surrounding the parts. Additional approaches of support material or resin removal from additively manufactured parts include raising and lowering liquid media temperature. Known approaches may utilize a single tank into which the raw additively manufactured parts are submerged, or they may include multiple tanks having different properties, including differing temperatures or liquids.

PostProcess Technologies, Inc. of Buffalo, NY has developed solutions for finishing additively manufactured parts. These solutions include software-controlled machines and specially designed chemical formulations.

A PostProcess® solution for removing support material from additively manufactured parts is described in U.S. Pat. No. 10,737,440, the disclosure of which is incorporated herein by reference. The solutions described in U.S. Pat. No. 10,737,440 as well as other systems from PostProcess Technologies, Inc., provide improved ways for finishing parts made by additive manufacturing. There exists room for further improvements.

SUMMARY OF THE INVENTION

The disclosed invention includes a system and method for removing support material or resin from additively manufactured parts. The system includes a processing pump at least a portion of which may be located in or adjacent to a processing tank filled with a liquid formulation suitable for removal of support material or resin from additively manufactured parts. The processing pump is adapted to create a vortex within the liquid formulation in the processing tank.

BRIEF DESCRIPTION OF THE DRAWINGS

For a fuller understanding of the nature and objects of the invention, reference should be made to the accompanying drawings and the subsequent description.

DETAILED DESCRIPTION OF THE INVENTION

Like drawing numbers on different drawing views identify identical, or functionally similar, structural elements of the invention.

Furthermore, it is understood that this invention is not limited to the particular methodology, materials, or modifications described and, as such, the invention may vary from that which is disclosed herein. It is also understood that the terminology used herein is for the purpose of describing particular aspects, and this invention is not limited to the disclosed aspects.

Unless defined otherwise, all technical and scientific terms used herein have the same meaning as commonly understood to one of ordinary skill in the art to which this invention pertains. It should be understood that methods, devices or materials similar or equivalent to those described herein can be used in the practice or testing of the method and system.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
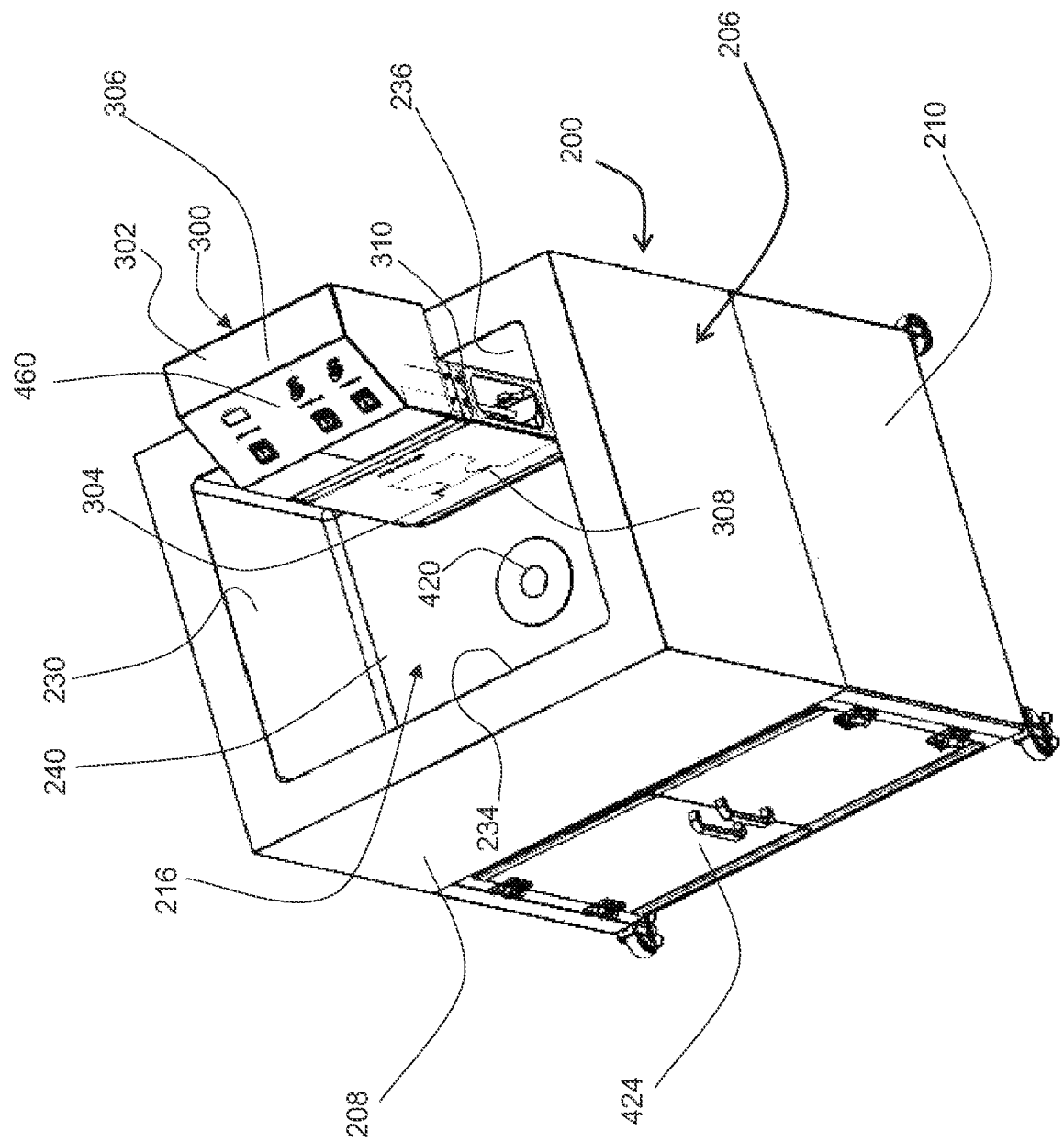
FIG. 1 is a perspective view of a support material or resin removal system according to an embodiment of the disclosed invention.

FIG. 1 shows a perspective view of a system 200 for removal of support material or resin from additively manufactured parts according to an embodiment of the present invention. The support material or resin removal system 200 in FIG. 1 is similar to the one disclosed in U.S. Pat. No. 10,737,440, except as otherwise disclosed herein. The support material or resin removal system 200 in FIG. 1 uses the PostProcess® Submersed Vortex Cavitation ("SVC") technology to remove support material or resin from additively manufactured parts.

The support material or resin removal system 200 includes a cabinet housing 206. The cabinet housing 206 includes a cabinet upper portion 208 and a cabinet lower portion 210. Located in the cabinet upper portion 208 is a processing tank 216. The processing tank 216 is suitably sized to hold a liquid formulation (shown in FIG. 6) having properties suitable for removal of support material or resin from additively manufactured parts. The processing tank 216 may be generally rectangular or cubic in shape. As shown in FIGS. 1-4, the processing tank 216 includes a left side wall 230, a right side wall 232, a front side wall 234, a back side wall 236, and a bottom wall 240. In this embodiment, the processing tank 216 has an open top although in alternative embodiments, the processing tank 216 has a cover or lid. In this embodiment, the processing tank 216 is approximately 75 cm by 60 cm wide and approximately 60 cm in height.

The support material or resin removal system 200 includes a processing pump 300. The processing pump 300 has a pump housing 302 with a pump housing lower portion 304 and a pump housing upper portion 306. In this embodiment, the pump housing 302 is attached to a wall of the processing tank 216, such as the back side wall 236. As shown in FIGS. 1-5, the pump housing lower portion 304 has a generally flat rectangular shape with a wide front side 308 facing inward into the processing tank 216, narrow right and left sides 310 and 312, and a back side 314. The pump housing lower portion 304 may be located in the processing tank 216 with the back side 314 flat against the back side wall 236 of the processing tank 216. The bottom of the pump housing lower portion 304 may rest on or may be close to the bottom wall 240 of the processing tank 216.

The pump housing lower portion 304 has a width that is less than the width of the back side wall 236 of the processing tank 216 thereby providing gaps on either side between the sides 310 and 312 of the pump housing lower portion 304 and the side walls 230 and 232 of the processing tank 216. In one embodiment, the pump housing lower portion 304 has a width of approximately 45 cm.

The pump housing upper portion 306 is located above the processing tank 216. The pump housing upper portion 306 has a depth dimension that is greater than that of the pump housing lower portion 304. The pump housing upper portion 306 is connected to or rest on a top edge of the back side wall 236 of the processing tank 216.

Figure 3:
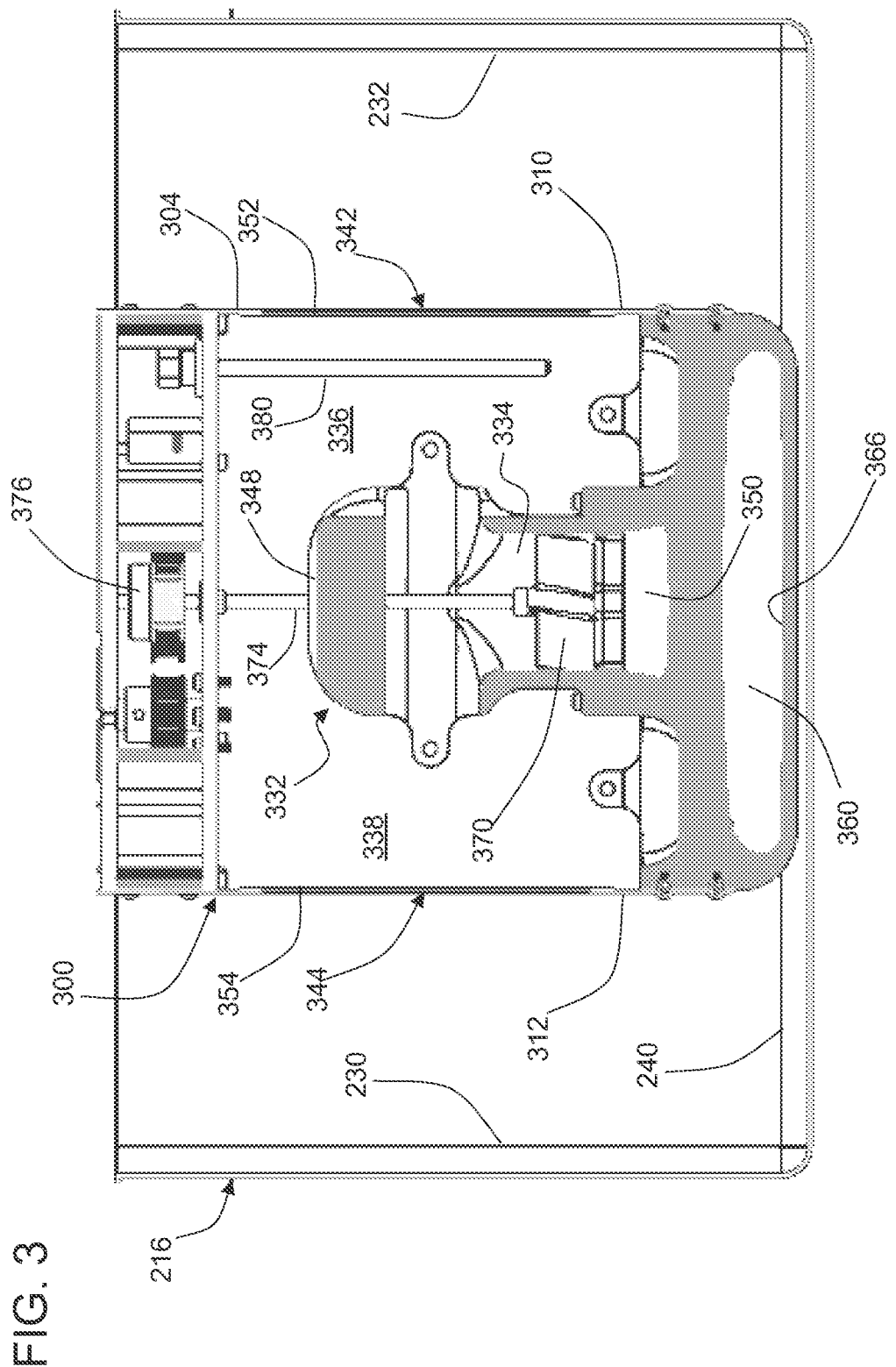
FIG. 3 is a cross sectional view of the processing tank and processing pump shown in FIGS. 1 and 2.
Figure 4:
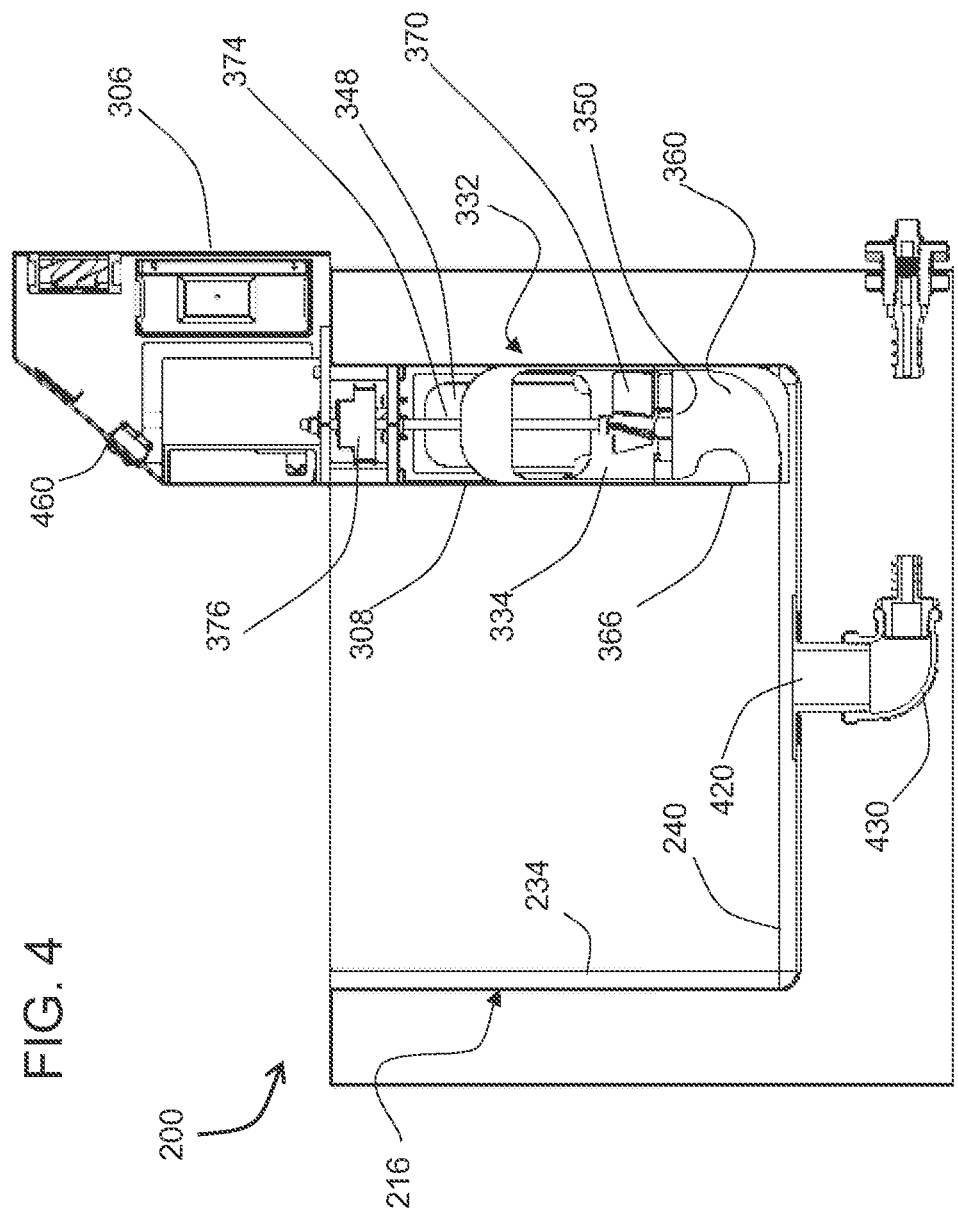
FIG. 4 is a cross sectional side view of the processing tank and processing pump shown in FIGS. 1-3.
Figure 5:
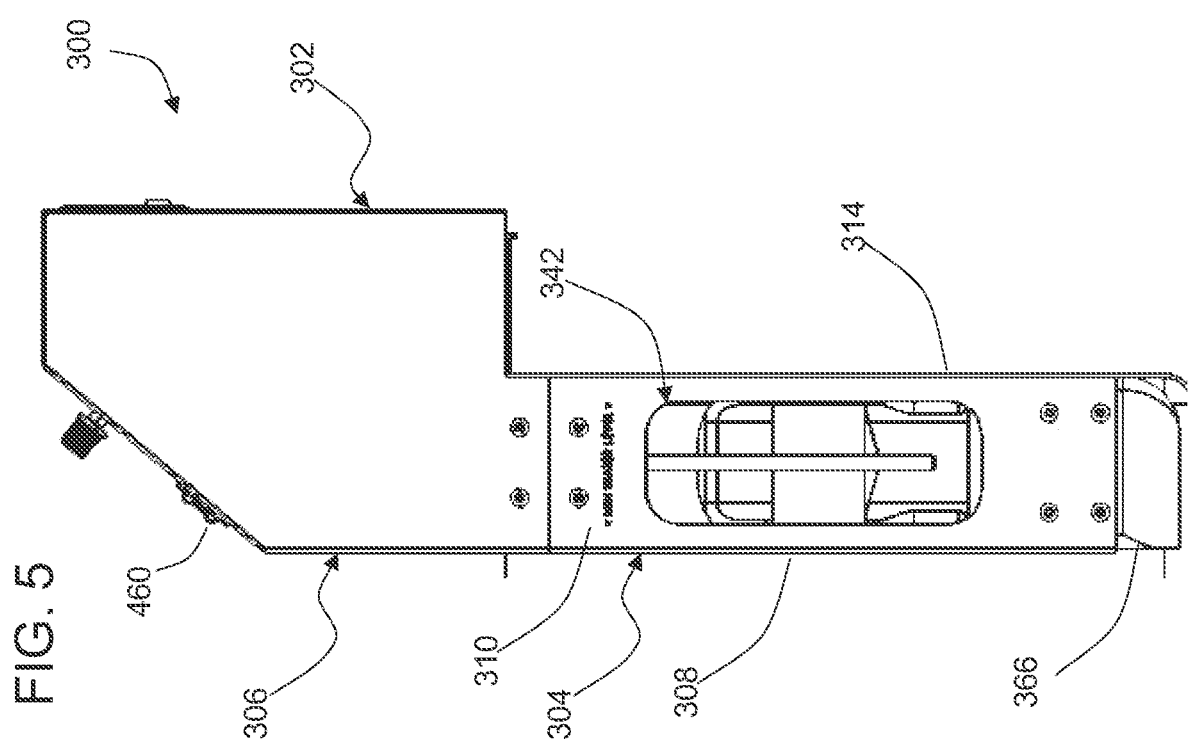
FIG. 5 is a side view of the processing pump shown in FIGS. 1-4.

Referring to FIGS. 3 and 4, located inside the processing pump housing 302 is a pump mechanism 332. In one embodiment, the pump mechanism 332 is a jet pump or other pump type which produces a rapid stream of liquid through a narrow opening or nozzle such as via a ducted propeller or other axial mechanism, centrifugal/impeller pump or combination thereof, e.g., mixed flow. This type of pump may provide advantages over other types of pumps including: less turbulent output/flow; variable output/flow; smoother (more even) output/flow; reduced or eliminated shock wave action; lower manufacture/purchase cost; fewer mechanical parts that wear; lower maintenance cost; higher reliability; more efficient output, e.g., output volume/pressure vs. energy consumed; extended run time; higher tolerance for corrosive or abrasive fluids; no fluid seals; or combinations thereof.

In this embodiment, the pump mechanism 332 includes an internal central fluid passageway 334. The internal central fluid passageway 334 includes an inlet side 348 and an outlet side 350. A right side fluid passageway 336 provides a fluid path between a right side opening 342 located in the right side 310 of the pump housing lower portion 304 and the inlet side 348 of the internal central fluid passage 334. A left side fluid passageway 338 provides a fluid path between a left side opening 344 on the left side 312 of the pump housing lower portion 304 and the inlet side 348 of the internal central fluid passageway 334. The right side opening 342 is located in an upper portion of the right side 310 of the pump housing lower portion 304 and the left side opening 344 is located in an upper portion of the left side 312 of the pump housing lower portion 304. The right side opening 342 and the left side opening 344 are located just below a level at which these openings 342 and 344 will be submerged when the processing tank 216 is filled with liquid formulation. In one embodiment, a right side filter 352 covers the right side opening 342 and a left side filter 354 covers the left side opening 344. These filters 352 and 354 are sized to prevent larger-sized pieces of support material or resin removed from additively manufactured parts from entering into the interior of the pump mechanism 332.

Figure 2:
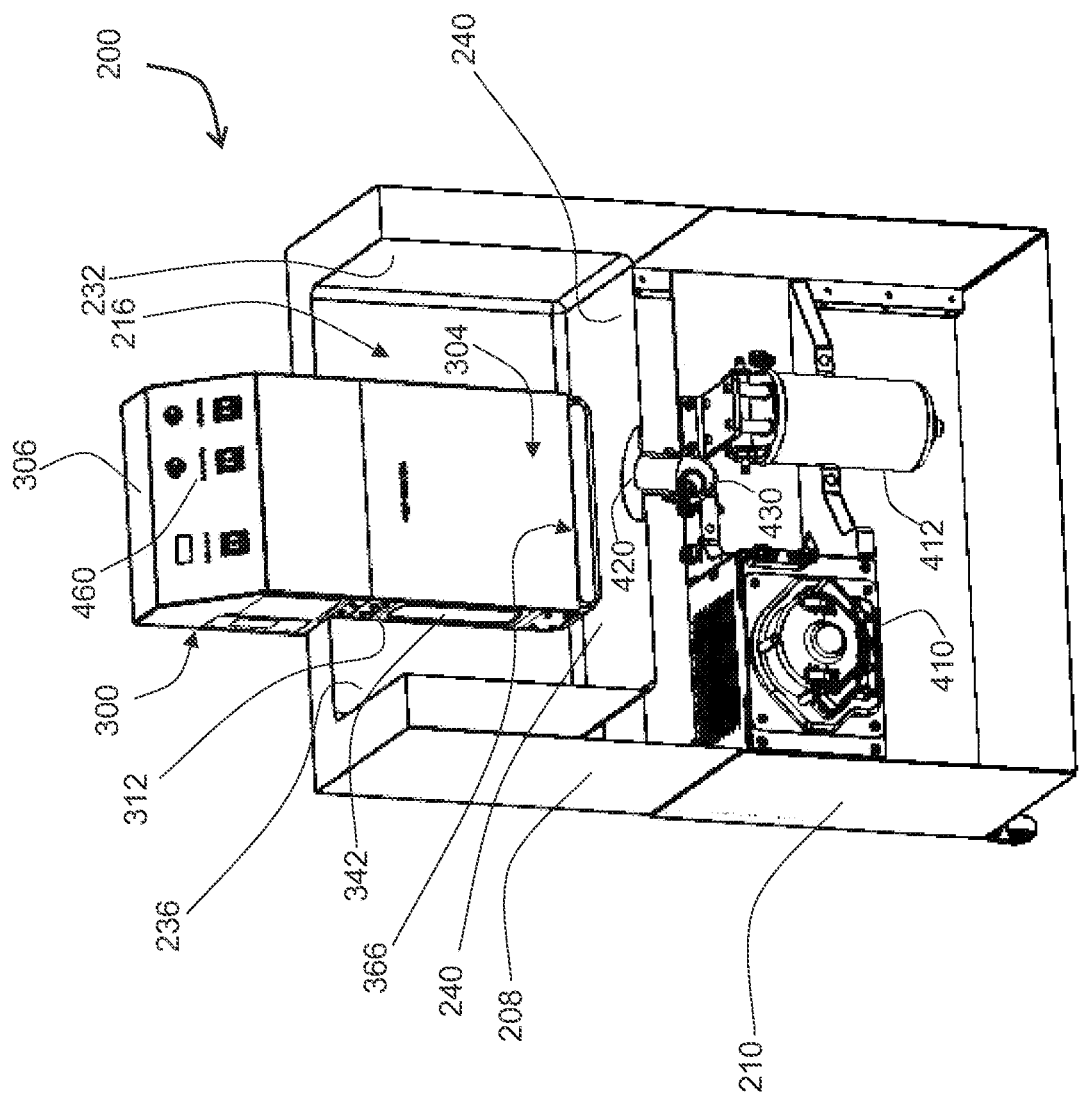
FIG. 2 is a cross sectional perspective view of the support material or resin removal system shown in FIG. 1.

A fluid outlet passageway 360 provides a fluid path from the outlet side 350 of the internal central fluid passageway 334 to an outlet opening 366 located along a bottom edge of the front side 308 of the pump housing lower portion 304. The outlet opening 366 is located vertically below the openings 342 and 344. The outlet opening 366 has a flattened profile. As shown in FIGS. 1, 2 and 3, the outlet opening 366 extends horizontally almost the entire width of the pump housing lower portion 304. The outlet opening 366 has a horizontal dimension of approximately 42 cm and a vertical dimension of approximately 4 cm.

Located in the internal fluid passageway 334 between the inlet side 348 and the outlet side 350 is an impeller 370. A drive shaft 374 connects the impeller 370 to a motor 376 located above the impeller 370. The motor 376 is operable to cause the impeller 370 to draw fluid from the openings 342 and 344 into the central fluid passageway 334 and expel the fluid out from the outlet opening 366. The motor 376 is operably connected to a power source, which in this embodiment is the power source of the support material or resin removal system 200. In one embodiment, the motor 376 is operable to cause a flow of 19 liters (5 gallons) per minute. Other flow operating levels and ranges may be suitable. In another embodiment, the flow is reversed by pulling fluid through openings 366, pumping generally upward and completing the flow circuit via openings 342 and/or 344.

As shown in FIG. 3, a heating element 380 is located in the right side fluid passageway 336. A second heating element (not shown) may be included in the left side fluid passageway 338.

Referring to FIG. 2, located below the processing tank 216 in the cabinet lower portion 210 is a secondary pump 410 and a filter 412. A drain 420 is located in the bottom wall 240 of the processing tank 216. A valve (not shown) is located in a pipe 430 between the drain 420 and the filter 412. As shown in FIG. 1, the cabinet lower portion 210 includes access doors 424 on a front side thereof.

Located in the pump housing upper portion 306 is a controller (not shown) operable to control operation of the support material or resin removal system 200. The controller may be similar to the one disclosed in U.S. Pat. No. 10,737,440. The controller is connected to the motor 376, the heater 380, the valve in the pipe 430, and other components of the support material or resin removal system 200. The controller is also connected to a user interface 460 located, for example, on the front side of the pump housing upper portion 306.

Figure 6:
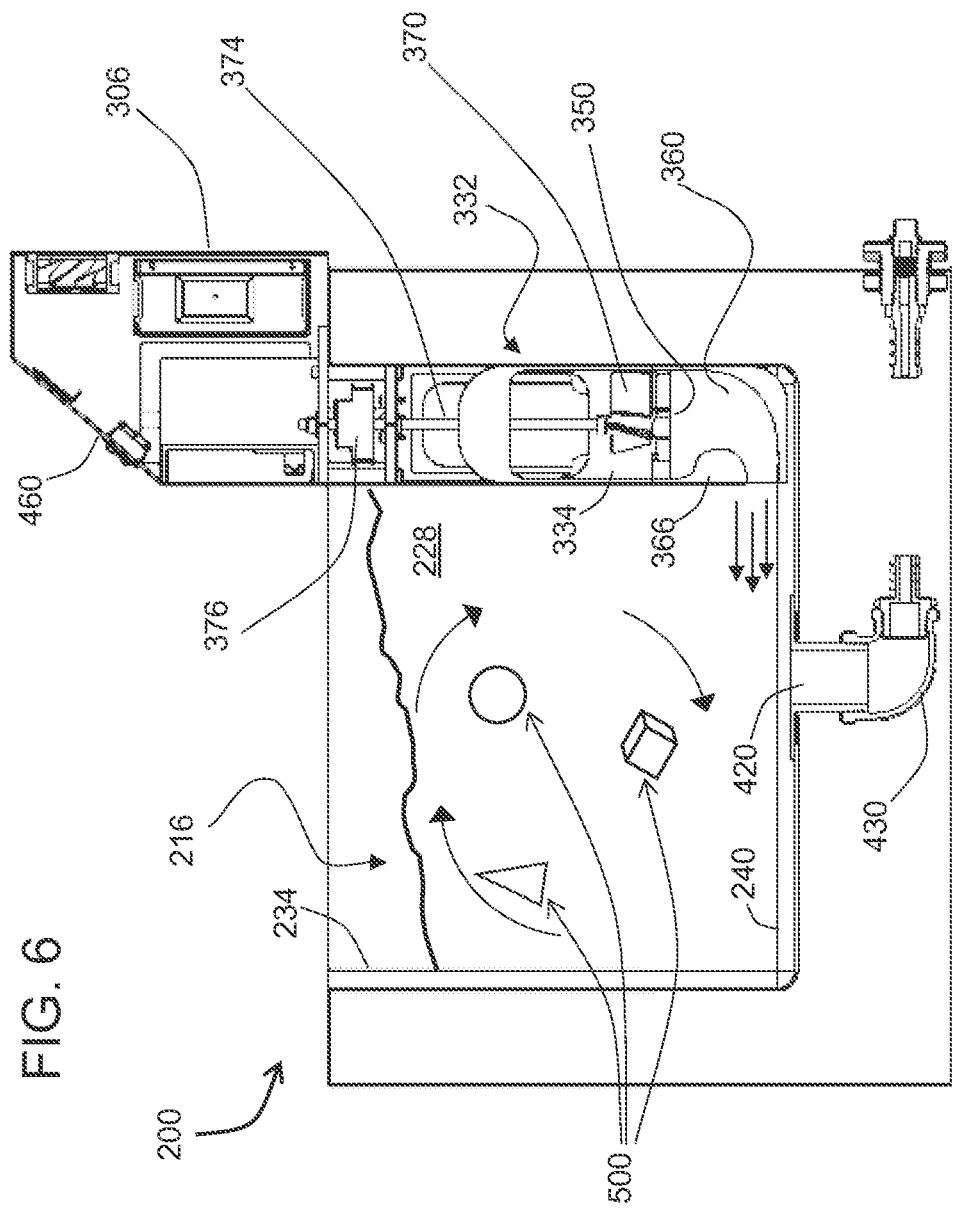
FIG. 6 is a cross sectional side view similar to FIG. 4 with the processing tank filled with a liquid formulation in which support material or resin is being removed from additively manufactured parts.

The support material or resin removal system 200 is operated similarly to the apparatus disclosed in U.S. Pat. No. 10,737,440, except as explained herein. FIG. 6 shows a side sectional view of the support material or resin removal system 200 with the processing tank 216 filled with a liquid formulation 228 having properties suitable for removal of support material or resin from additively manufactured parts. Like the systems disclosed in U.S. Pat. No. 10,737,440, a suitable liquid formulation is chosen. Suitable liquid formulations include PostProcess® PLM-101-SUB, PLM-201-SUB, PLM-301-SUB, PLM-401-SUB, PLM-402-SUB, and PLM-403-SUB. Suitable liquid formulations also include those disclosed in WO2019/203852, WO2020/056316A1 and WO 2021/195320. The liquid formulation 228 may be added to the processing tank 216 via the secondary pump 410 up through the drain 420. Alternatively, the liquid formulation 228 may be added manually by an operator, for example, pouring it into the processing tank 216. Alternatively, the liquid formulation 228 may be added via another pumping mechanism.

After the processing tank 216 is filled with the liquid formulation 228, additively manufactured parts 500 are added into the processing tank 216. The additively manufactured parts 500 have support material or resin adhered thereto. The support material or resin needs to be removed before the additively manufactured parts 500 can be used for their intended purposes.

Operating parameters may be set by the operator using the user interface 460. Alternatively, the operating parameters may be preset or predetermined. The liquid formulation 228 may be heated using the heater element 380. The operating parameters (such as the speed, runtime, flow rate) of the processing pump 300 can be set or adjusted to produce the desired vortex flow. Then, the pump mechanism 332 is operated to cause the desired vortex flow of the liquid formulation 228 within the processing tank 216. As explained in U.S. Pat. No. 10,737,440, a vortex flow provides advantages for removal of support material or resin from additively manufactured parts.

It is noted that in the embodiment of the support material or resin removal system 200 of FIGS. 1-6, the inlets 342 and 344 into the processing pump 300 are located on the sides of the pump housing lower portion 304 and not directly tangentially in line with the vortex flow produced in the processing tank 216. The inlets 342 and 344 open toward the gaps on either side of the pump housing lower portion 304 between the sides 310 and 312 of the pump housing lower portion 304 and sides 230 and 232 of the processing tank 216. The sizes of these inlets 342 and 344 are relatively larger than the size of the outlet opening 366 thereby enabling the processing pump 300 to create a desired vortex of liquid formulation in the processing tank 216 by pumping the liquid formulation out from the outlet opening 366 that has a wide horizontal dimension but a narrow vertical dimension.

Alternatives

In the embodiment depicted in FIGS. 1-6, the support material or resin removal system 200 is shown as not having an overflow tank like the one disclosed in U.S. Pat. No. 10,737,440. In alternative embodiments, the support material or resin removal system may have an overflow tank into which liquid formulation flows either continuously or intermittently.

The pump mechanism shown in FIGS. 3 and 4 includes an impeller. Other means or mechanisms may be used instead of an impeller, such as paddles, fins, blades, suction, pressure, peristaltic movement, combinations thereof, etc.

In an alternative embodiment, the processing pump is removable from the processing tank. An operator or another person can install the processing pump 300 prior to using the support material or resin removal system to finish additively manufactured parts and then remove the processing pump after using the support or resin removal system to finish the additively manufactured parts. This embodiment allows the processing pump to be used in more than one different processing tank, including processing tanks of different sizes in different support or resin removal systems. In this embodiment, the processing pump can be installed in a first support material or resin removal system and operated to finish additively manufactured parts in the first support material or resin removal system. Then, the processing pump can be removed from the processing tank in the first support material or resin removal system and installed in a different processing tank in a second support material or resin removal system which is then operated to remove support material or resin from a different collection of additively manufactured parts. There are several advantages of using one processing pump in more than one processing tank. For example, a second batch of parts can be finished in the second processing tank while the first processing tank is being cleaned. Further, parts can be left to soak in a processing tank in one system while the processing pump is being used in another processing tank in a different system.

In an embodiment described above, it was stated that the processing pump had a flow capacity of approximately 19 liters (5 gallons) per minute. In alternative embodiments, the processing pump can have different flow capacities and can be operated at different speeds, including variable speeds, to thereby cause different flow rates. These speeds can be selected to facilitate the support material or resin removal process taking into account factors such as speed of operation, the types of parts being finished, the type of support material or resin being removed, and other factors.

Gyre Pump Alternative Embodiment

Figure 7:
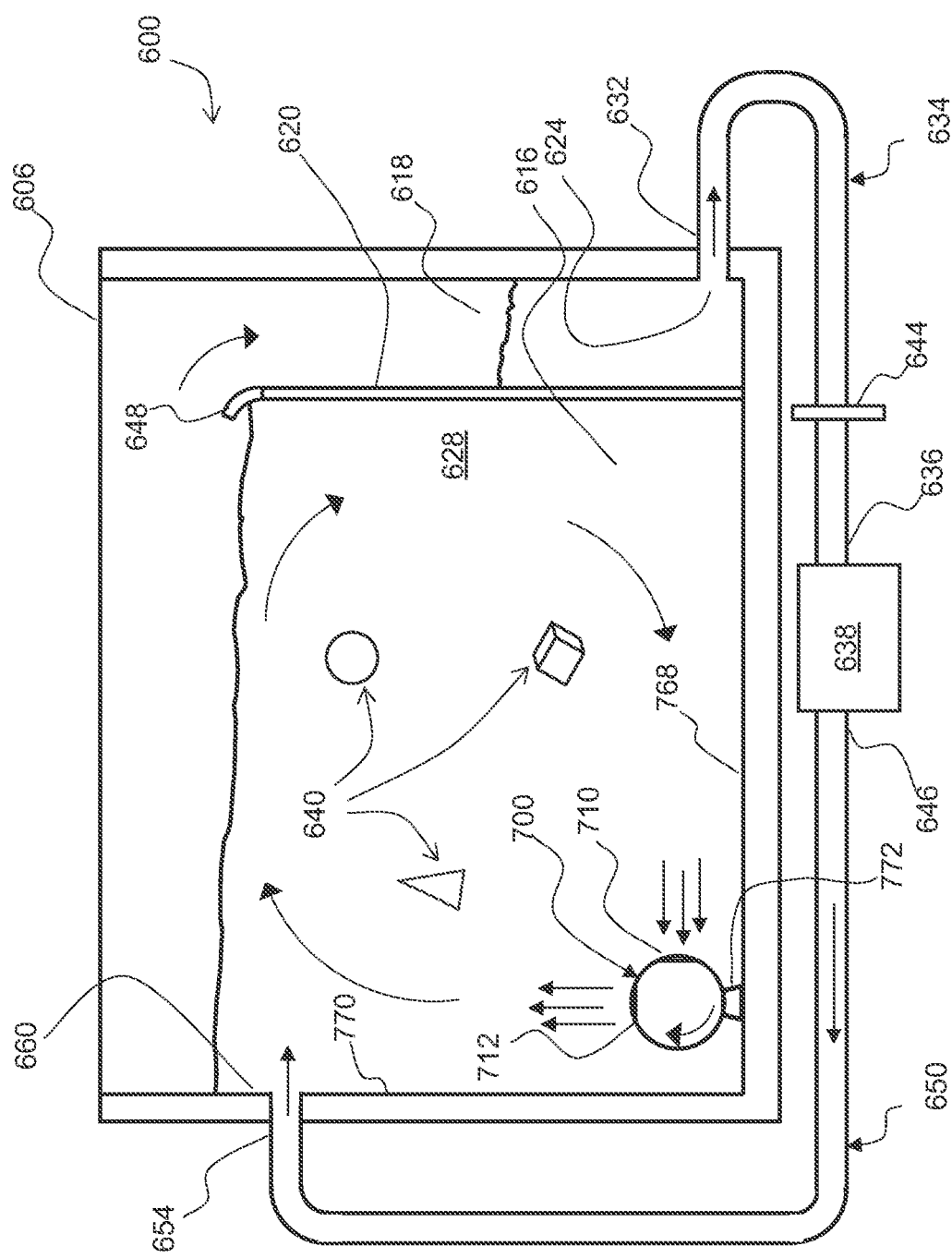
FIG. 7 is a cross sectional view of a support material or resin removal system according to another embodiment of the disclosed invention.

FIG. 7 shows a cross sectional view of a system 600 for removal of support material or resin from additively manufactured parts, according to an alternative embodiment of the present invention. The support or resin removal system 600 in FIG. 7 is similar to the one disclosed in FIGS. 1-6, except as otherwise disclosed herein. The support or resin removal system 600 in FIG. 7 uses the PostProcess® Submersed Vortex Cavitation ("SVC") technology to remove support material or resin from additively manufactured parts.

The system 600 includes a housing 606 in which is located a processing tank 616 and an overflow tank 618. The processing tank 616 is suitably sized to hold a liquid formulation 628 having properties suitable for removal of support material or resin from additively manufactured parts. The processing tank 616 is generally rectangular or cubic in shape. The overflow tank 618 is adjacent to the processing tank 616. The processing tank 616 is separated from the overflow tank 618 by a dividing wall 620. The dividing wall 620 has a height suitable to cause the dividing wall 620 to act as a weir between the processing tank 616 and the overflow tank 618. When the liquid formulation 628 in the processing tank 616 reaches the level of the top of the dividing wall 620, the liquid formulation 628 will flow over the dividing wall 620 from the processing tank 616 to the overflow tank 618. Optionally, a screen, mesh or perforated panel 648 is located along the top of the dividing wall 620 to prevent large sizes of support material or resin from passing over the dividing wall 620.

Near the bottom of the overflow tank 618 is a liquid circulation outlet 624. A first end 632 of a first piping section 634 connects to the liquid circulation outlet 624. A circulation pump 638 connects to a second end 636 of the first piping section 634. Optionally, the first piping section 634 contains an inline filter 644. A first end 646 of a second piping section 650 connects to an outlet of the circulation pump 638. A second end 654 of the second piping section 650 connects to an inlet 660 of the processing tank 616.

Figure 8:
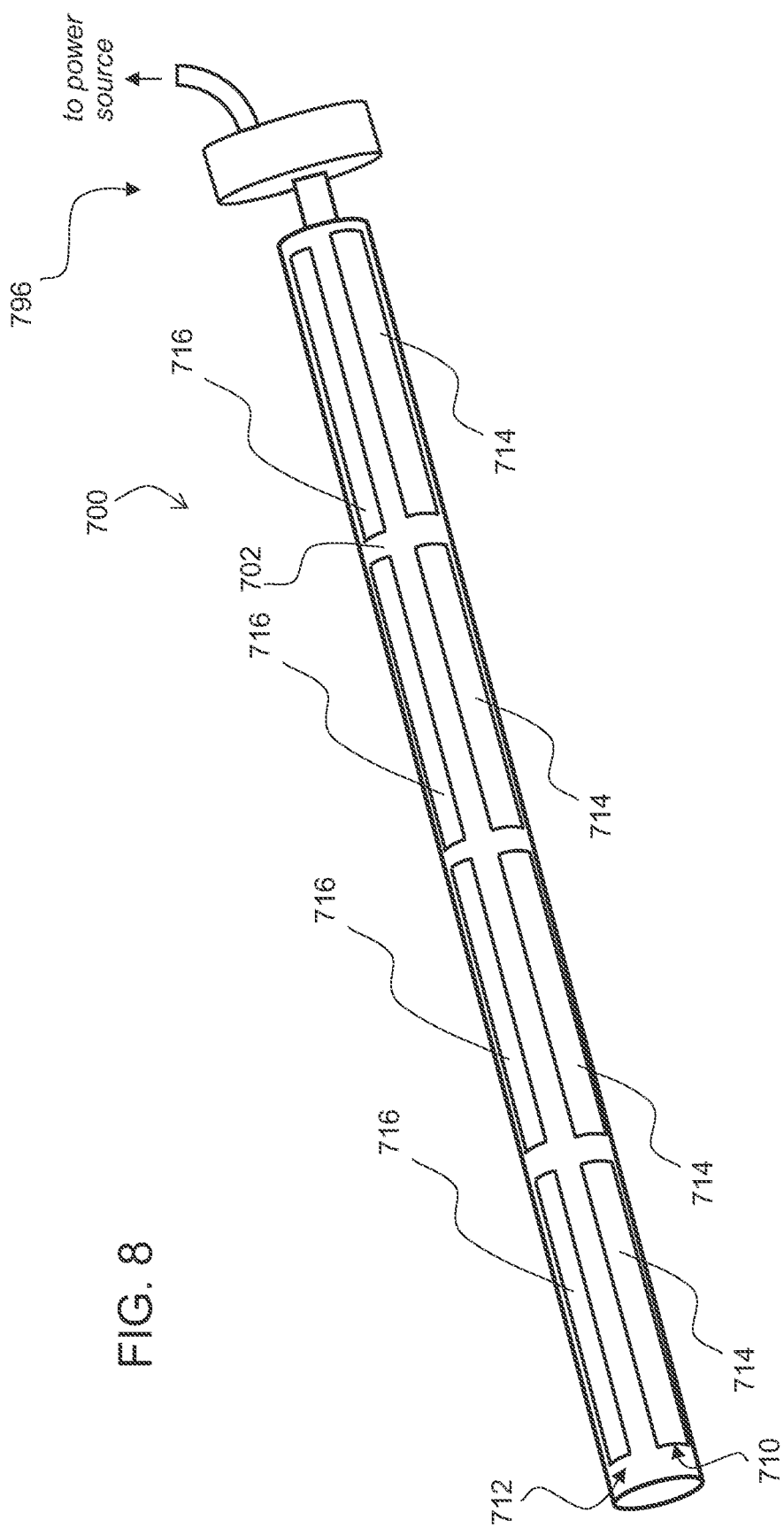
FIG. 8 is a perspective view of the processing pump shown in FIG. 7.

Located in the processing tank 616 is a processing pump 700. As shown in FIG. 8, the processing pump 700 has a pump body 702 having a generally elongate shape. The processing pump 700 may have a cylindrical cross section or a cross section of a different suitable shape. The processing pump 700 includes an inlet 710 and an outlet 712. As shown in FIG. 8, the inlet 710 is comprised of a series of spaced openings 714 that extend in the elongate direction of the pump body 702. The outlet 712 also is comprised of a series of spaced openings 716 that extend in the elongate direction of the pump body 702. The inlet 710 and the outlet 712 are located on the pump body 702 so that the pump inlet 710 and pump outlet 712 are oriented approximately 90 degrees apart from each other.

In one embodiment, the processing pump is a gyre pump. Other suitable types of pumps may be used, such as a paddle pump or a wave pump. In one embodiment, a suitable pump is a Maxspect Gyre 300 Series pump. The flow capacity of the processing pump is selected to match the size of the processing tank in order to create the desired vortex flow. In one embodiment, the processing tank has a capacity of approximately 19 liters (5 gallons) and the processing pump has a flow capacity of approximately 20,000 liters (5200 gallons)/hour.

Referring again to FIG. 7, the processing pump 700 (or at least a portion thereof) is located in a corner of the processing tank 616. In the embodiment shown in FIG. 7, the processing pump 300 is located adjacent and proximate to a bottom corner of the processing tank 616 where a bottom wall 768 meets a vertical wall 370 which is opposite the dividing wall 620. In the embodiment shown in FIG. 7, the processing pump 300 is attached to a wall of the processing tank 616. In the embodiment in FIG. 7, a mounting bracket 772 attaches the processing pump 700 to the bottom wall 768 of the processing tank 616.

Figure 9:
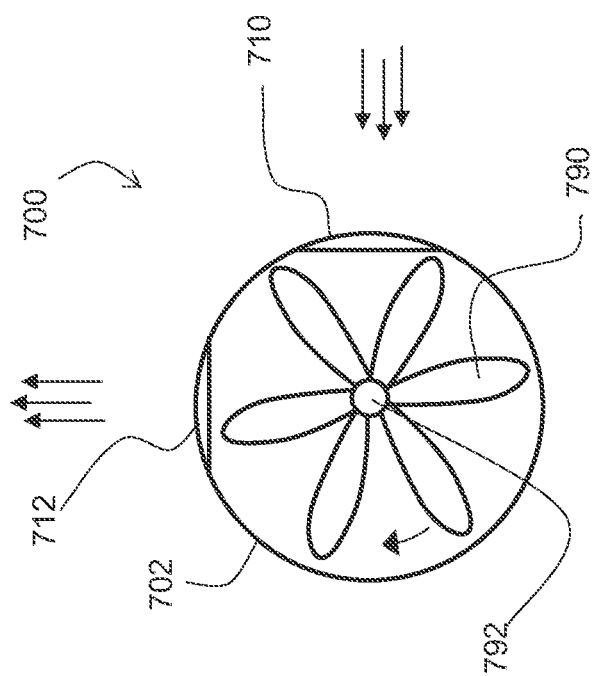
FIG. 9 is a cross sectional view of the processing pump shown in FIGS. 7 and 8.

FIG. 9 shows a cross sectional view of the processing pump 700. Inside the body 702 of the processing pump 700 is a means or mechanism for drawing liquid into the pump body 702 through the inlet 710 and expelling the liquid out from the pump body 702 via the outlet 712. In the embodiment shown in FIG. 9, this means or mechanism for drawing liquid through the pump 700 is an impeller 790. The impeller 790 includes impeller blades that are curved in a rotational direction to scoop the liquid at the inlet 710 and push the liquid through the pump body 702 to eject the liquid at the outlet 712. Other means or mechanisms may be used instead of an impeller, such as paddles, fins, blades, suction, pressure, combinations thereof, etc. In FIG. 9, the impeller 790 is mounted on a rotatable shaft 792 which is operable to rotate the impeller 790 to cause liquid to be drawn into the pump body 702 through the inlet 710 and expel the liquid out from the pump body 702 via the outlet 712.

As shown in FIG. 8, the pump 700 includes a motor 796. The motor 796 is operatively connected to the shaft 702 of the impeller 790 (in FIG. 9) to cause the impeller 790 to rotate. The motor 796 is operably connected to a power source, which in this embodiment is the power source of the support or resin removal system 600.

Operation

The embodiment of the system 600 for removal of support material or resin from additively manufactured parts in FIG. 7 is operated similarly to the apparatus disclosed in U.S. Pat. No. 10,737,440, except as explained herein. Like the systems disclosed in U.S. Pat. No. 10,737,440, the liquid formulation 628 is chosen and introduced via an inlet (not shown) into the processing tank 616 and/or the overflow tank 618. Suitable liquid formulations include PostProcess® PLM-101-SUB, PLM-201-SUB, PLM-301-SUB, PLM-401-SUB, PLM-402-SUB, and PLM-403-SUB. Suitable liquid formulations also include those disclosed in WO2019/203852, WO2020056316A1 and WO 2021/195320. The liquid formulation 628 is added until the processing tank 616 contains a sufficient level of the liquid formulation 628. Additively manufactured parts 640 are introduced into the processing tank 616. Operating parameters may be set by the operator using a control panel or other user interface. Alternatively, the operating parameters may be preset or predetermined. The liquid formulation 628 may be heated using a heater (not shown). The operating parameters (such as the speed, runtime, flow rate) of the processing pump 700 can be set or adjusted to produce the desired vortex flow. Then, the pump 700 is operated to cause the desired vortex flow of the liquid formulation 628 within the processing tank 616. As explained in U.S. Pat. No. 10,737,440, a vortex flow provides advantages for removal of support material or resin from additively manufactured parts.

Alternative Embodiments

In the embodiment of the system 600 for removing support material or resin from additively manufactured parts depicted in FIG. 7, the processing pump 700 is shown to be located adjacent and proximate to a bottom corner of the processing tank 616 where the bottom wall 768 meets the vertical wall 770 which is opposite the dividing wall 620. In alternative embodiments, systems for removing support material or resin from additively manufactured parts can have a processing pump in different locations and orientations in the processing tank.

Figure 10:
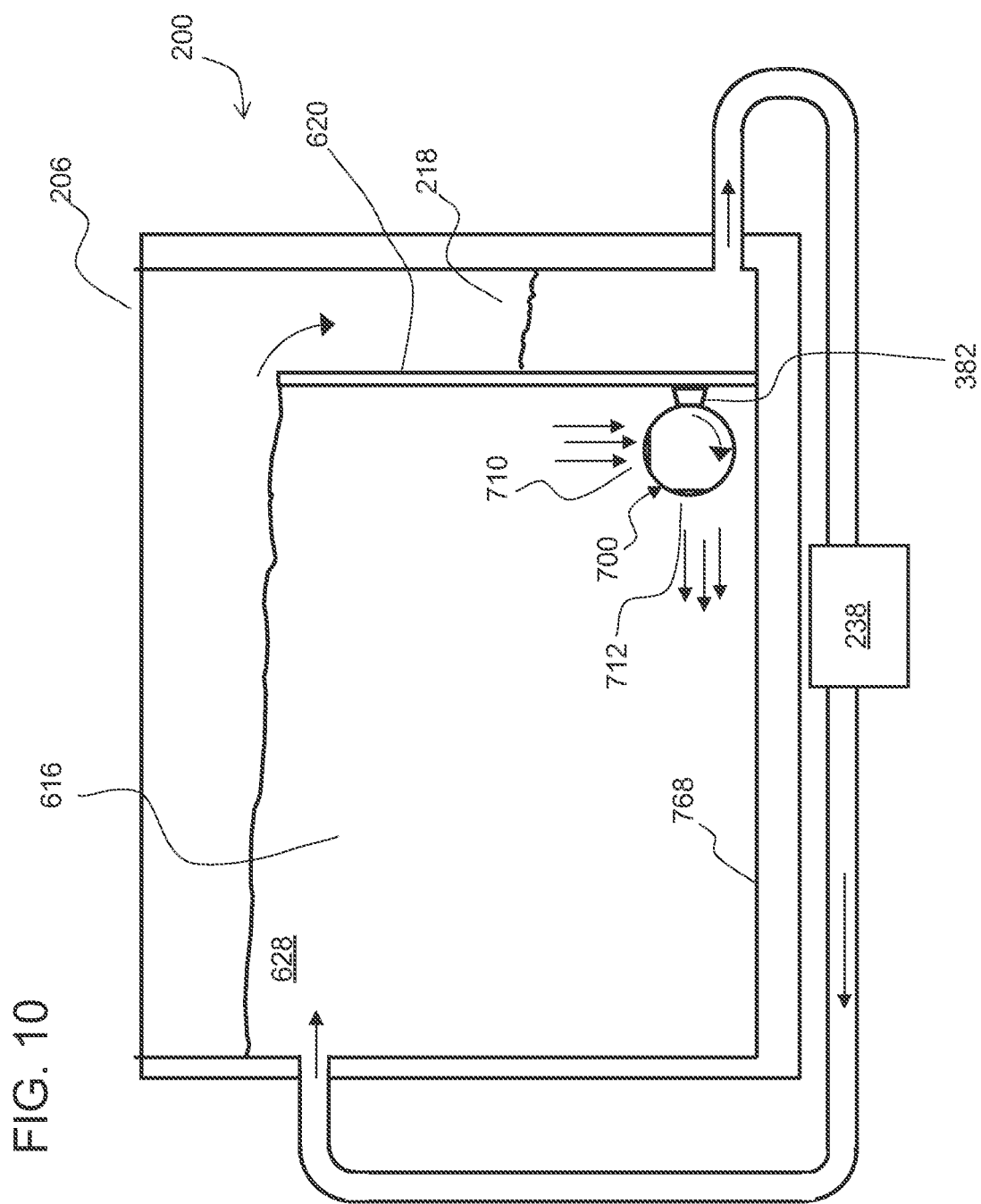
FIG. 10 is a cross sectional view of another alternative embodiment of the support material or resin removal system according to the disclosed invention.

In one alternative embodiment shown in FIG. 10, the processing pump 700 is located adjacent a corner of the processing tank 616 where the bottom wall 768 meets the dividing wall 620. In this embodiment, the inlet 710 of the processing pump 300 is oriented upward to draw liquid formulation 628 down into the processing pump 700 and the outlet 712 is oriented horizontally away from the dividing wall 620 to expel liquid formulation 628 away from the dividing wall 620.

Figure 11:
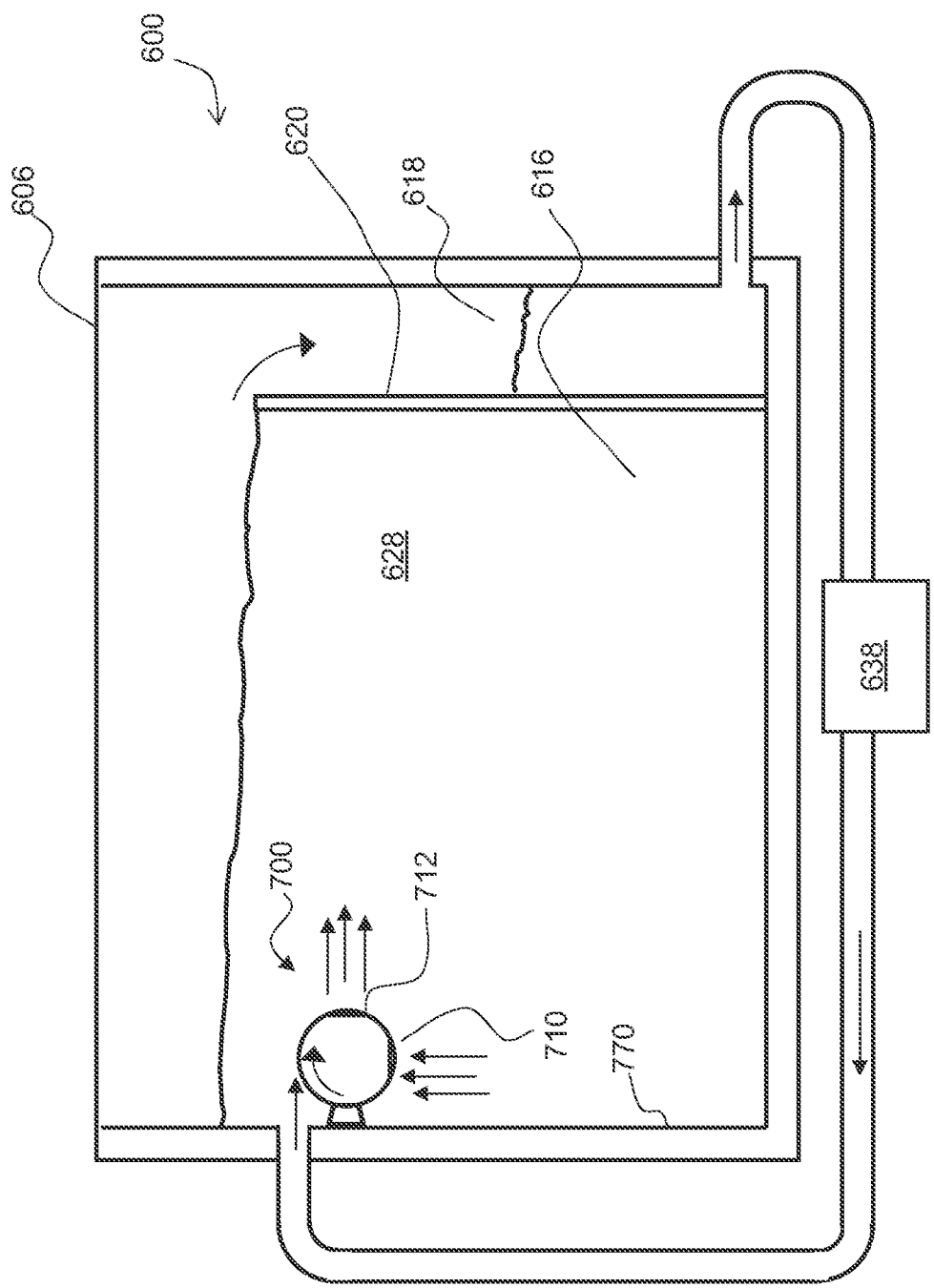
FIG. 11 is a cross sectional view of yet another alternative embodiment of the support material or resin removal system according to the disclosed invention.

In another alternative embodiment shown in FIG. 11, the processing pump 700 is located high on the wall 770 of the processing tank 616 so that it is near an upper surface of the liquid formulation 628 in the processing tank 616. In this embodiment, the inlet 710 of the processing pump 700 is oriented downward to draw liquid up into the processing pump 700 and the outlet 712 is oriented horizontally away from the wall 770 to expel liquid formulation 628 toward the dividing wall 620.

Figure 12:
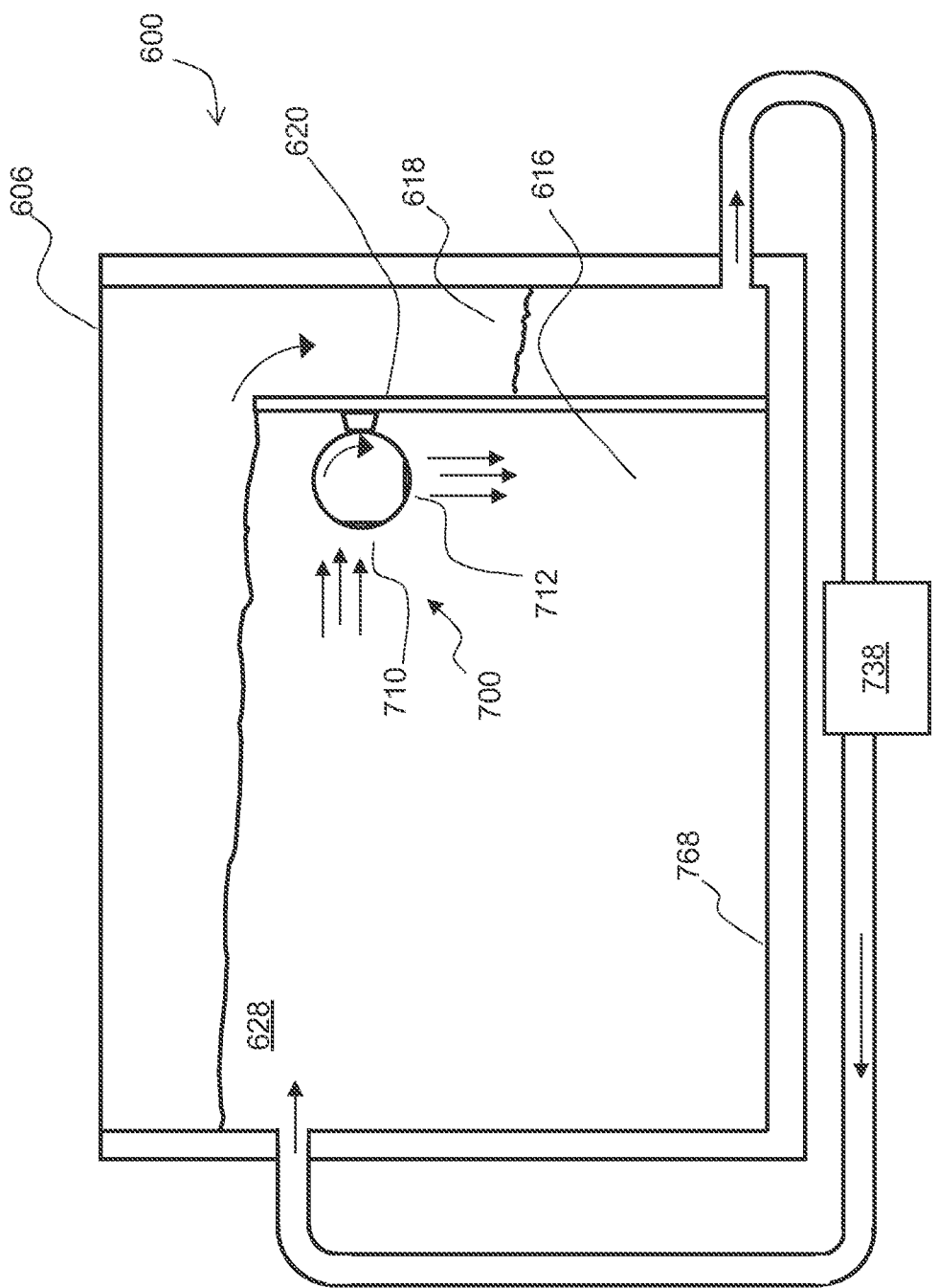
FIG. 12 is a cross sectional view of still another alternative embodiment of the support material or resin removal system according to the disclosed invention.

In the alternative embodiment shown in FIG. 12, the processing pump 700 is located high on the dividing wall 620 of the processing tank 616 so that it is near an upper surface of the liquid formulation 628 in the processing tank 616. In this embodiment, the inlet 710 of the processing pump 700 is oriented horizontally to draw liquid formulation 628 horizontally into the processing pump 700 and the outlet 712 is oriented vertically downward away from the surface of the liquid formulation 628 in the processing tank 616 toward the bottom wall 768 to expel liquid downward.

Figure 13:
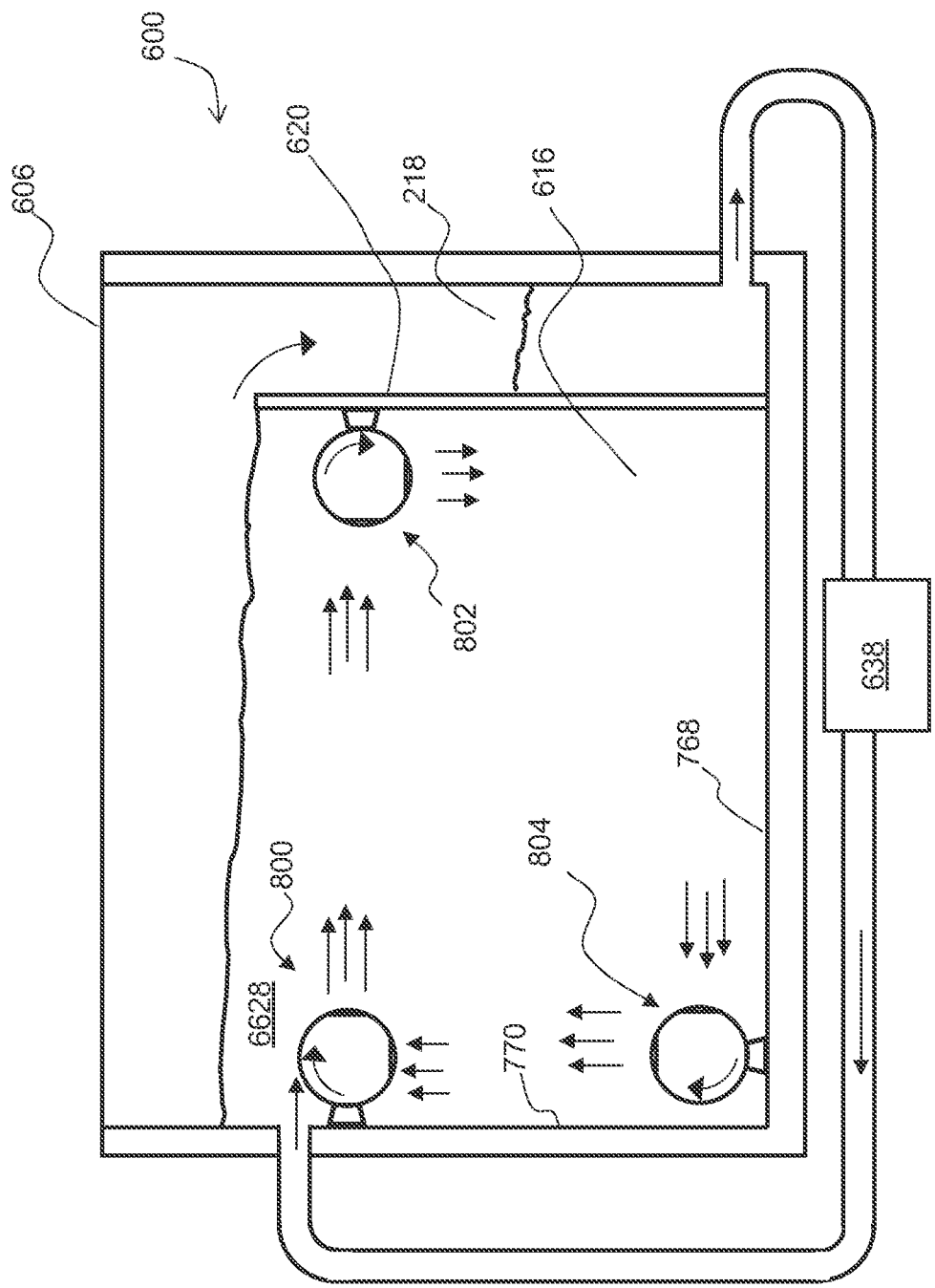
FIG. 13 is a cross sectional view of yet still another alternative embodiment of the support material or resin removal system according to the disclosed invention.

In further embodiments, the support or resin removal system may include more than one processing pump. FIG. 13 shows an embodiment of a support or resin removal system having three processing pumps, 800, 802, and 804. Each of the processing pumps 800, 802, and 804 is similar or identical to the processing pump 700 described in connection with FIG. 7. In the embodiment in FIG. 13, the processing pump 800 is located high on the wall 770 of the processing tank 616 near an upper surface of the liquid formulation 628 in the processing tank 616 so that it draws liquid formulation 628 up into the processing pump 800 and expels liquid formulation 628 horizontally toward the dividing wall 620. The processing pump 802 is located high on the dividing wall 620 of the processing tank 616 so that it draws liquid formulation 628 horizontally into the processing pump 802 and expels liquid formulation 628 downward. The processing pump 804 is located adjacent and proximate to a bottom corner of the processing tank 616 where the bottom wall 768 meets the vertical wall 770 so that it draws liquid formulation 628 in horizontally from across the bottom wall 768 and expels liquid formulation 628 out vertically upward along the wall 770.

Other embodiments of the support or resin removal system with multiple processing pumps may have other configurations of locations of the processing pumps. For example, alternative embodiments of the support or resin removal system may have three processing pumps in three different three corners of the processing tank compared to the embodiment shown in FIG. 13. Further alternative embodiments of the support or resin removal system may have two processing pumps located at adjacent or opposite diagonal corners of the processing tank. Further embodiments may include four processing pumps, one in each corner. In a still further alternative embodiment, a single motor can be used to drive the flow producing mechanisms in more than one processing pump body.

Regardless of the number, location or orientation of processing pumps, in each of the embodiments the processing pumps cause the liquid formulation to form a desired vortex flow to provide for removal of support material or resin from additively manufactured parts. Each processing pump produces a laminar flow of liquid formulation along the walls it is at a corner of. The laminar flow along these walls in turn causes a laminar flow around a horizontal axis centrally located in the processing tank which is parallel to the longitudinal elongate direction of each of the processing pumps.

Figure 14:
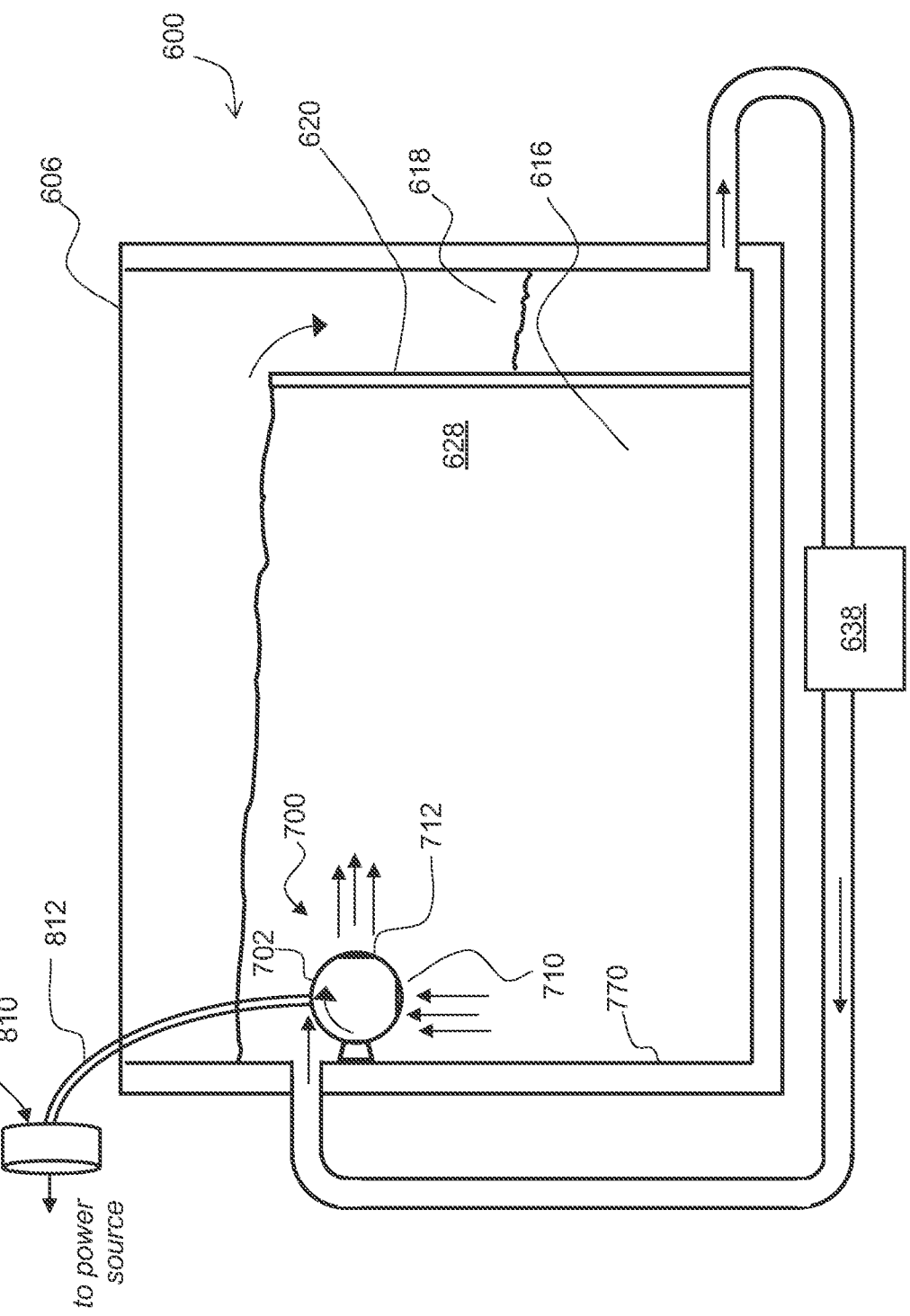
FIG. 14 is a cross sectional view of still yet another alternative embodiment of the support material or resin removal system according to the disclosed invention.

FIG. 14 shows another embodiment of the support or resin removal system. In this embodiment, the processing pump body 702 and its internal components, such as the water pumping mechanism (e.g., the impeller), are located in the processing tank 616 beneath the surface of the liquid formulation 628. In this embodiment, the motor portion 810 of the processing pump 700 is located above the surface of the liquid formulation 628 or even outside the processing tank 616. The motor portion 810 of the processing pump 700 is connected to the liquid pumping mechanism inside the processing pump body 702 by a drive shaft 812 or other means by which the output of the motor 810 can cause the liquid pumping mechanism inside the processing pump body 702 to rotate. Instead of a drive shaft, the motor can be connected to the liquid pumping mechanism inside the processing pump body by a chain, a belt, gearing, magnetic coupling, or other means. An advantage of this embodiment is that the motor 810 (including electrical components thereof) can be located and operated outside of the liquid formulation 628.

Figure 15A:
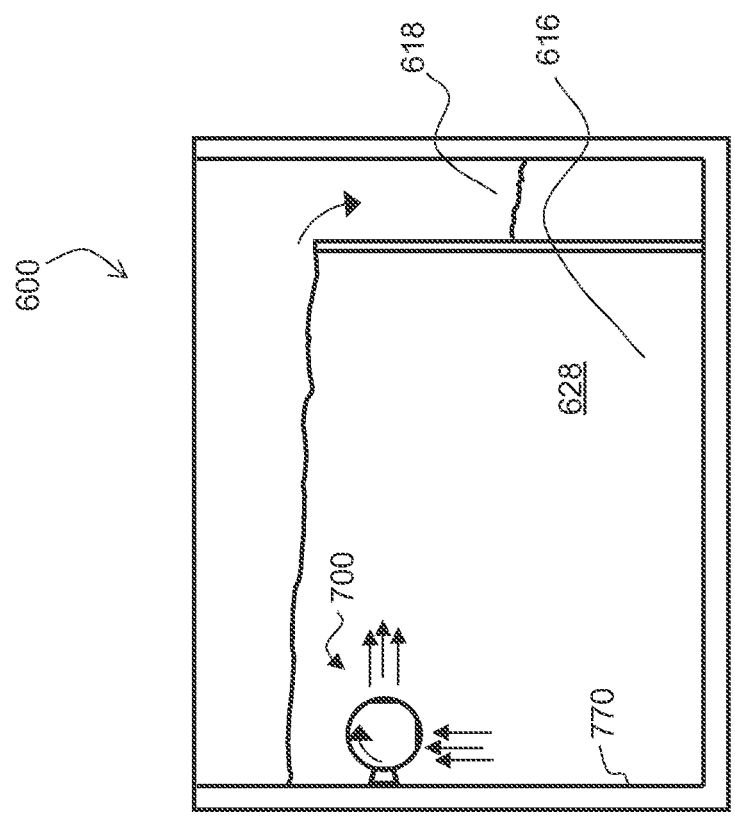
FIGS. 15A and 15B are cross sectional view of a further alternative embodiment of the support material or resin removal system according to the disclosed invention.
Figure 15B:
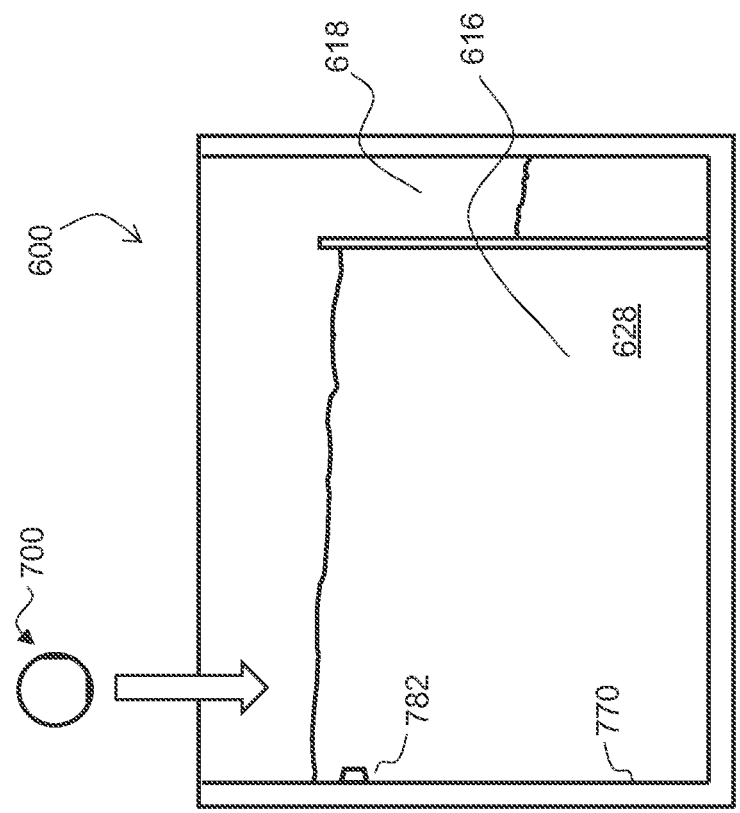

FIGS. 15A and 15B show another embodiment of the support or resin removal system. In this embodiment, the processing pump 700 is removable from the processing tank 616. An operator or another person can install the processing pump 700 prior to using the support or resin removal system to finish additively manufactured parts and then remove the processing pump after using the support or resin removal system to finish the additively manufactured parts. This embodiment allows the processing pump 700 to be used in more than one different processing tank, including processing tanks in different support or resin removal systems. In this embodiment, the processing pump 700 can be installed in a first support or resin removal system and operated to finish additively manufactured parts in the first support or resin removal system. A mounting bracket 782 is located on a wall 770 for this purpose. Then, the processing pump 700 can be removed from the processing tank in the first support or resin removal system and installed in a different processing tank in a second support removal system which is then operated to remove support material or resin from a different collection of additively manufactured parts. There are several advantages of using one processing pump in more than one processing tank. For example, a second batch of parts can be finished in the second processing tank while the first processing tank is being cleaned. Further, parts can be left to soak in a processing tank in one system while the processing pump is being used in another processing tank in a different system.

Figure 16:
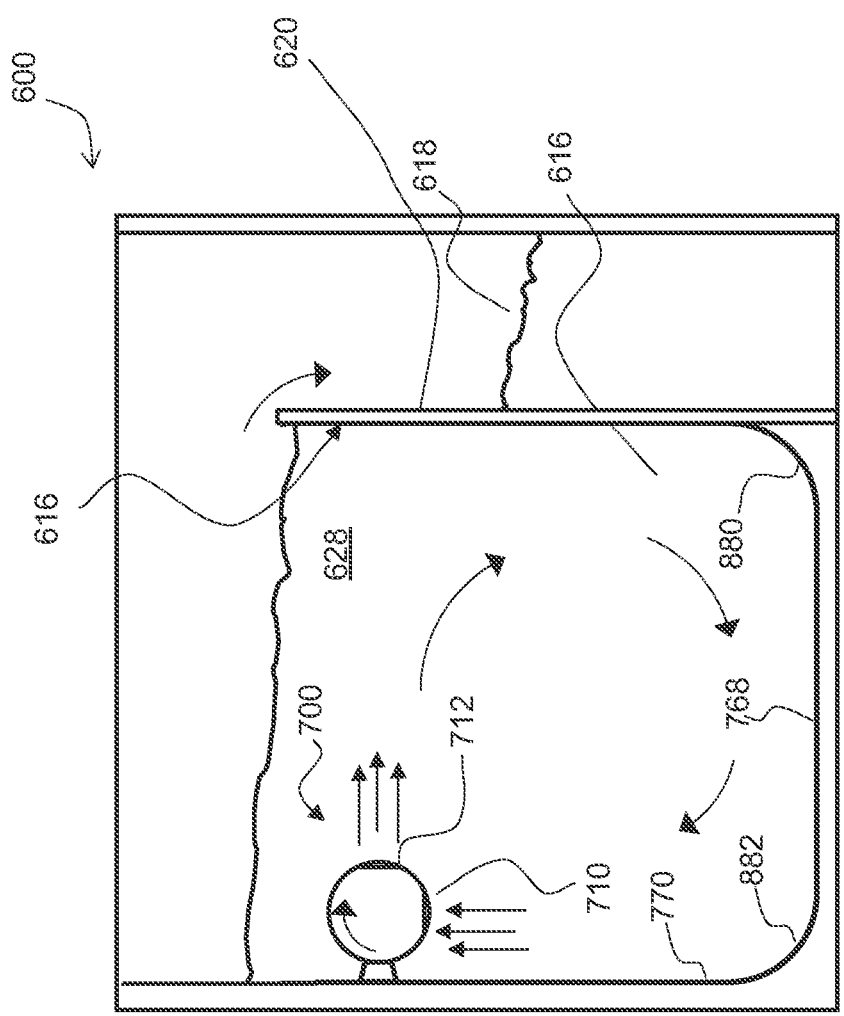
FIG. 16 is a cross sectional view of still yet another further alternative embodiment of the support material or resin removal system according to the disclosed invention.

FIG. 16 shows another embodiment of the support or resin removal system. In the embodiment of FIG. 16, the processing tank 616 has one or more curved corners. As shown in FIG. 16, the processing tank 616 has a first curved corner 880 between the dividing wall 620 and the bottom wall 668. The processing tank 616 has a second curved corner 882 between the bottom wall 768 and the vertical wall 770. The shape and size of the curved corners facilitate and enhance production of a desired vortex flow of the liquid formulation 268 in the processing tank 616.

Draft Tube Embodiment

Figure 17:
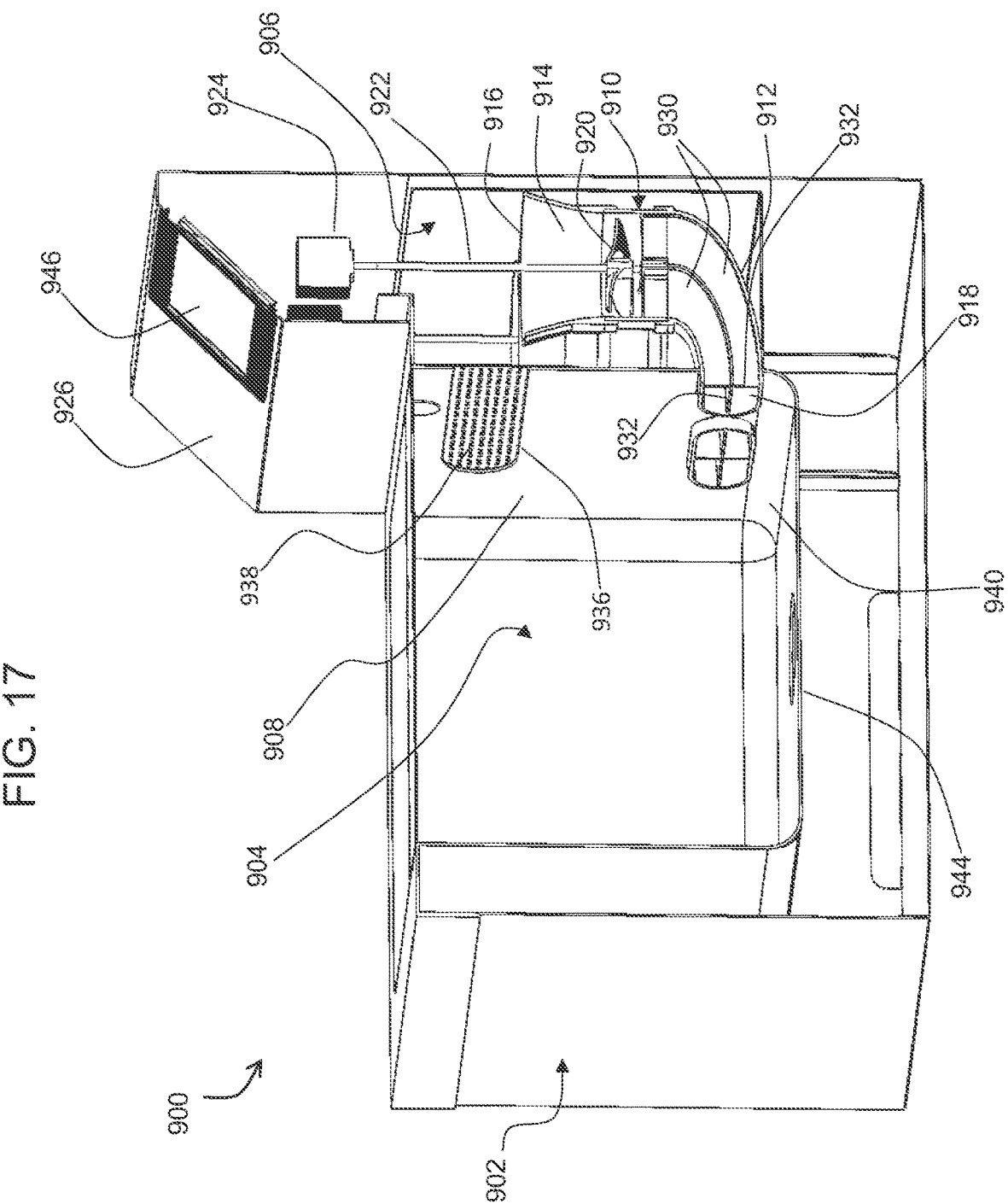
FIG. 17 is a sectional perspective view of another embodiment of a system for support or resin removal.
Figure 18:
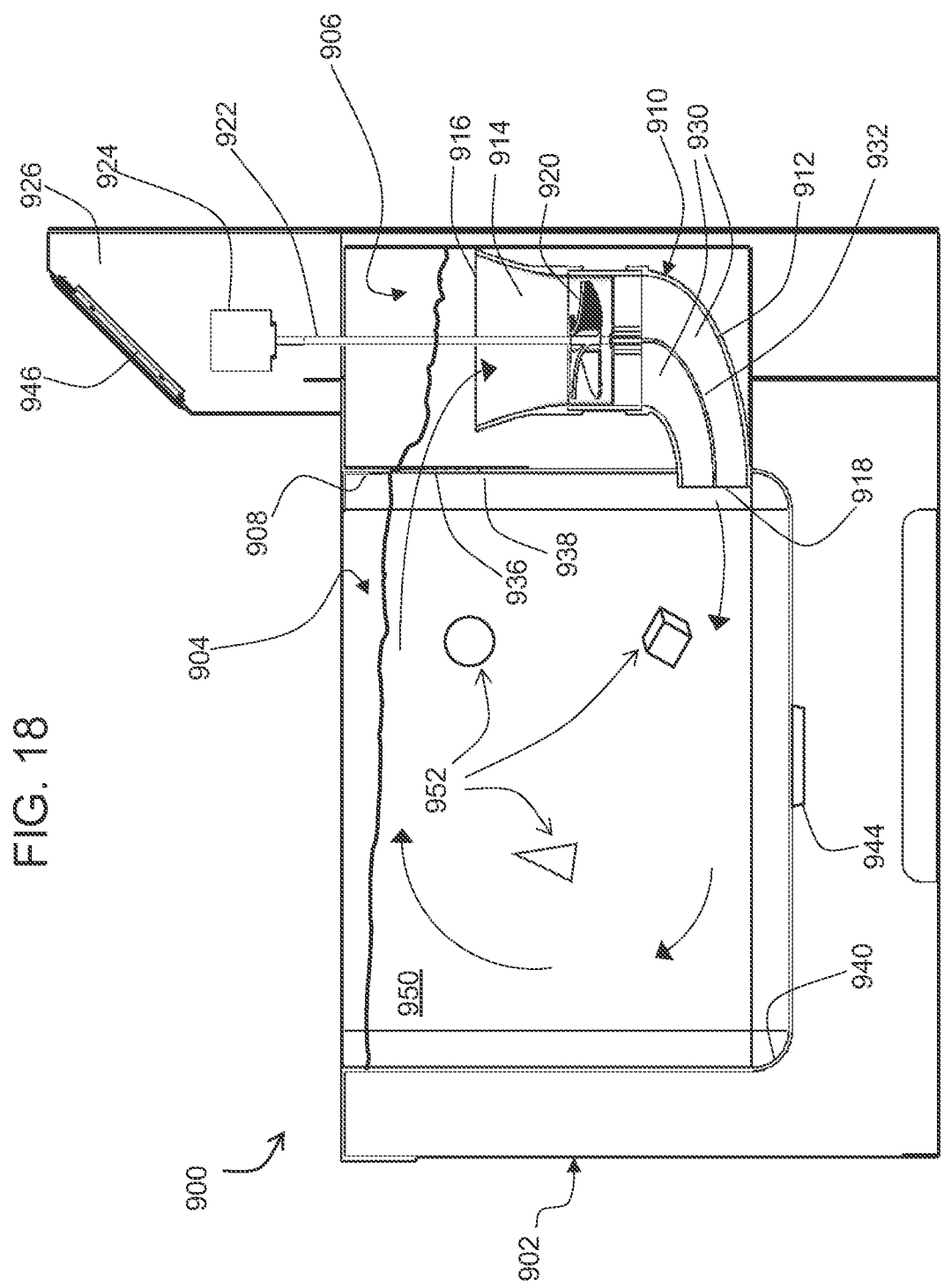
FIG. 18 is a sectional side view of the embodiment of the system in FIG. 17.

FIGS. 17 and 18 show another embodiment of a system 900 for support material or resin removal. Like the embodiments described above, the system 900 in FIGS. 17 and 18 is similar to the systems disclosed in U.S. Pat. No. 10,737,440, except as otherwise disclosed herein. The system 900 uses the PostProcess® Submersed Vortex Cavitation ("SVC") technology to remove support material or resin from additively manufactured parts.

The system 900 includes a housing 902 in which is located an agitation chamber 904 and an adjacent chamber 906. The agitation chamber 904 and the adjacent chamber 906 are separated by a wall 908. The agitation chamber 904 is suitably sized to hold the liquid formulation having properties suitable for removal of support material or resin from additively manufactured parts. The agitation chamber 904 is generally rectangular or cubic in shape. In this embodiment, the agitation chamber 904 is approximately 50 cm (19.875 inches) wide, 17 cm (16.875 inches) deep, and 33 cm (12.875 inches) in height. The adjacent chamber 906 has a width of approximately 15 cm (6 inches), a depth of approximately 17 cm (16.875 inches), and a height of approximately 33 cm (12.875 inches). The wall 908 extends up to a top edge of the agitation chamber 904 and the adjacent chamber 906. When full and in operation, the agitation chamber 904 and adjacent chamber 906 have a combined capacity of approximately 75-87 liters (20-23 gallons). Other dimensions, shapes, and volumes may be suitable for the agitation chamber 904 and the adjacent chamber 906. In this embodiment, the agitation chamber 904 and adjacent chamber 906 are composed of stainless steel or a polymeric material such as polyamide or acrylonitrile-butadiene-styrene, although other materials may be suitable.

The system 900 includes one or more draft tubes 910. The one or more draft tubes 910 are located in the adjacent chamber 904. The embodiment of the system 900 shown in FIGS. 17 and 18 includes three draft tubes 910, one of which is shown in section in FIGS. 17 and 18. (The other two draft tubes are not shown although the outlet of one of the other draft tubes is shown in FIG. 17 next to the outlet of the draft tube 910 shown in section.) Each draft tube 910 is similar in size and construction. The draft tubes 910 are evenly spaced along the wall 908 inside the adjacent chamber 906.

Each draft tube 910 includes an elbow-shaped body 912 that defines an internal passage 914 having an inlet 916 and an outlet 918. The inlet 916 and outlet 918 are oriented 90 degrees apart. The draft tube body 912 is made of a suitably hard, durable material, such as nylon or ABS. Other durable materials may be suitable including metals. In one embodiment, the draft tube body 912 is formed by an additive manufacturing process. The inlet 916 is oriented vertically upward and open to an interior of the adjacent chamber 906. The outlet 918 is oriented approximately horizontally and extends through an opening near the bottom of the wall 908 into the agitation chamber 904. In this embodiment, the draft tube outlet 918 is approximately 3 cm (1.25 inches) from the bottom edge of the wall 908. The draft tube 910 is mounted in the adjacent chamber 906 by means of brackets or other hardware. Alternatively, the draft tube 910 may be affixed to the wall 908.

Located in the internal passage 914 of each draft tube 910 is an impeller 920. Other means or mechanisms may be used instead of an impeller to cause liquid flow, such as paddles, fins, blades, suction, pressure, peristaltic movement, combinations thereof, etc.

The impeller 920 is connected to a drive shaft 922 that extends vertically upward out of the adjacent chamber 906. The drive shaft 922 connects to a motor 924. In this embodiment, each draft tube 910 has its own separate drive shaft 922 and motor 924. The motor 924 is located in a control interface housing 926. The motor 924 is operatively connected to a controller (not shown) located in the control interface housing 926. Each motor 924 is sized to provide a flow capacity of approximately 45 liters (12 gallons) per minute.

In this embodiment, the draft tube 910 has an overall height of approximately 18 cm (7 inches). The diameter of the internal passage 914 of the draft tube 910 is approximately 12 cm (4.875 inches) at the inlet 916 and tapers to approximately 9 cm (3.5 inches) at the location of the impeller 920. The diameter of the internal passage 914 remains approximately 9 cm (3.5 inches) from the location of the impeller 920 to the outlet end 918.

As shown in FIG. 17, a lower portion of the internal passage 914 includes multiple separate channels 930. In this embodiment, the internal passage 914 includes four separate channels 930, although a different number of separate channels may be suitable. The channels 930 are formed by one or more dividing walls 932. The channels 930 begin adjacent to the impeller 920 and extend through the internal passage 914 to the outlet 918. The channels 930 help to reduce turbulence in the agitation chamber 904 and the adjacent chamber 906.

The wall 908 includes an opening 936. The opening 936 is located in an upper portion of the wall 908 above the outlets 918 of the draft tubes 910. A filter screen 938 fully covers the opening 936. The filter screen 938 prevents particles removed from additively manufactured parts from clogging the draft tubes 910. The opening 936 and filter screen 938 have a generally rectangular shape with flat upper and lower sides and rounded left and right sides. The opening 936 and filter screen 938 are approximately 21 cm (8.25 inches) wide and 6 cm (2.375 inches) high. An upper edge of the opening 936 and filter screen 938 is approximately 4.5 cm (1.75 inches) from the top edge of the wall 908. In this embodiment, the filter screen 938 has openings of approximately 0.64 cm (0.25 inches) so that particles larger than approximately that size are prevented from flowing into the adjacent chamber 908 and the draft tubes 910.

As shown in FIGS. 17 and 18, lower corners 940 of the agitation chamber 904 are rounded where the vertical walls of the agitation chamber 904 join the bottom wall thereof, called fillets. These rounded lower corners or fillets 940 facilitate flow in the agitation chamber 904 and reduce accumulation of particles and/or resin in the corners.

Located in the middle of the bottom wall of the agitation chamber 904 is a drain 944. The drain 944 connects to suitable valved piping (not shown) to allow the liquid formulation to be removed from the agitation chamber 904 when operation is complete. T The control interface housing 926 also includes a user interface panel 946 which is operably connected to a controller (not shown).

Operation

The embodiment of the system 900 in FIGS. 17 and 18 is operated similarly to the apparatus disclosed in U.S. Pat. No. 10,737,440, except as explained herein. Like the systems disclosed in U.S. Pat. No. 10,737,440, a liquid formulation 950 (shown in FIG. 18) is chosen and introduced into the agitation chamber 904 or the adjacent chamber 906. The liquid formulation 950 may be introduced via an inlet (not shown) or by pouring it directly into the agitation chamber 904. Suitable liquid formulations include those disclosed above in connection with the other embodiments. Referring to FIG. 18, the liquid formulation 950 is added until the agitation chamber 904 contains a sufficient level of the liquid formulation 950. In this embodiment, the liquid formulation 950 is added until the level of liquid formulation 950 in the agitation chamber 904 is higher than at least a lower edge of the opening 936 in the wall 908 so that liquid formulation 950 will flow through the opening 936 from the agitation chamber 904 to the adjacent chamber 906. In this embodiment, approximately 75 liters (20 gallons) of liquid formulation 950 are added. Additively manufactured parts 952 are introduced into the liquid formulation 950 in the agitation chamber 904. Operating parameters may be set by the operator using the user interface 946. Alternatively, the operating parameters may be preset or predetermined. The liquid formulation 950 may be heated using a heater (not shown). The operating parameters (such as the speed, runtime, flow rate) of the motors 924 can be set or adjusted to produce the desired vortex flow. Then, the draft tubes 910 (including the impeller 920 and motor 924) are operated to cause the desired vortex flow of the liquid formulation 950 within the agitation chamber 904. As explained in U.S. Pat. No. 10,737,440, a vortex flow provides advantages for removal of support material from additively manufactured parts. As shown in FIG. 18, each of the draft tubes 910 expels liquid formulation 950 out of the outlet 918 to form a laminar flow of liquid formulation 950 across the bottom side of the agitation chamber 904. The laminar flow along the bottom side of the agitation chamber 904 is redirected upward along the wall opposite the wall 908 and then redirected back along a surface side of the liquid formulation 950 in the agitation chamber 904 toward the opening 936. The liquid formulation 950 passes through the opening 936 into the adjacent chamber 906. The liquid formulation 950 then is drawn back into the inlet 916 of the draft tube 910 where it is pumped again back to the agitation chamber 906.

Alternative Draft Tube Embodiments

In the embodiment described above and shown in FIGS. 17 and 18, the draft tubes 910 are positioned so that the outlet 918 of each draft tube opens into the agitation chamber 904 close to a bottom edge of the wall 908 so that the flow of liquid formulation is directed horizontally away from the wall 908 along the bottom wall of the agitation chamber 904. In an alternative embodiment, the draft tubes 910 can be positioned upside down compared to the embodiment shown in FIGS. 17 and 18. In this alternative, the outlets 918 of the draft tubes 910 are located near the top edge of the wall 908 and oriented horizontally so that the flow of liquid formulation is directed horizontally away from the wall 908 along the upper surface side of the liquid formulation in the agitation chamber 904. In this alternative embodiment, the opening 936 and filter 938 are located close to a bottom side edge of the wall 908 to receive the flow of liquid formulation back into the adjacent chamber 906. In further alternative embodiments, the draft tubes may be positioned above or below the agitation chamber 904 to cause a vortex flow of liquid formulation in the agitation chamber 904.

In an embodiment described above, it was stated that the processing pump had a flow capacity of approximately 20,000 liters (5200 gallons)/hour. In alternative embodiments, the processing pump can have different flow capacities and can be operated at different speeds, including variable speeds, to thereby cause different flow rates. These speeds can be selected to facilitate the support material or resin removal process taking into account factors such as speed of operation, the types of parts being finished, the type of support material or resin being removed, and other factors.

In some of the embodiments described above, the processing pump is described as being connected to a wall or floor of the processing tank by a bracket. In alternative embodiments, the processing pump may be suspended in the liquid formulation, float in or on the liquid formulation, connected or mounted on a frame, or may even be connected to the part(s) being cleaned.

In the embodiments disclosed in FIGS. 1-18, the tank and the pump are shown as separate components. In alternative embodiments, the tank and the pump may be formed as a single component, such as by building the features and functions of the pump into a wall of the tank.

In another alternative embodiment, a single pump can be adapted for use with multiple tanks. In this alternative, the single pump is connected to multiple tanks by suitable piping, tubing, manifolds and/or hoses. The multiple tanks can be used to remove support material or resin from additively manufactured parts in the multiple tanks simultaneously or sequentially. The flow rate of the pump may be adjusted appropriately, e.g., to accommodate the additional simultaneous flow in the multiple tanks. This embodiment has several advantages, such as being able to remove support material or resin from multiple batches of additively manufactured parts while keeping the batches separate. Further, utilizing a single pump with multiple tanks may reduce costs and maintenance requirements.

The embodiments of the support material or resin removal systems in FIGS. 1-18 operate differently from the systems disclosed in U.S. Pat. No. 10,737,440 in the following ways. In the systems disclosed in U.S. Pat. No. 10,737,440, circulation of the liquid formulation (i.e., the creation of the vortex) is caused by pumping the liquid formulation out of one or more sets of nozzles that are located in the processing tank and oriented to cause formation of the vortex. The nozzles receive the liquid formulation under pressure from a pump that draws the liquid formulation from the overflow tank through piping inside the support removal or resin system unit. In the embodiments of FIGS. 1-18, the vortex is created by the processing pump (e.g., 300, 700) or draft tube 910 which is located in or adjacent to the tank. In the embodiments of FIGS. 1-18, the pump does not draw liquid formulation from the overflow tank, but instead draws liquid formulation from within the tank in which the parts are processed. The pump produces a laminar flow of the liquid formulation along the walls of the tank. The laminar flow along these walls causes a laminar flow of liquid formulation along an upper surface of the liquid formulation the tank. The laminar flow of liquid formulation in turn produces a vortex about a horizontal axis located centrally in the tank.

The embodiments of FIGS. 1-18 do not require any specific amount of recirculation in order to obtain a desired vortex flow. The embodiments of FIGS. 1-18 are able to obtain a desired vortex flow entirely by means of the pump (or draft tube) which is located inside or adjacent to the processing tank without the need to recirculate any liquid formulation from an overflow tank. With the embodiments of FIGS. 1-18, a desired level of recirculation can be chosen independently of the need to draw liquid to create sufficient flow to create a vortex.

The embodiments disclosed above are described as using a liquid formulation for support material removal or resin removal. For purposes of this disclosure, the liquid formulation may include formulations in addition to those disclosed above, including formulations having different chemicals or combinations and concentrations of chemicals, including for example IPA and/or water.

A system like the one described herein can be used in systems or equipment that finish or otherwise process parts produced by other than additive manufacturing processes. For example, a system like the one described herein can be used in systems or equipment that finish or otherwise process parts produced by traditional manufacturing processes or other kinds of non-traditional manufacturing processes.

In the foregoing description, example embodiments are described. The specification and drawings are accordingly to be regarded in an illustrative rather than a restrictive sense.

It will be appreciated that various aspects of the above-disclosed invention and other features and functions, or alternatives thereof, may be desirably combined into many other different systems or applications. Various presently unforeseen or unanticipated alternatives, modifications, variations, and/or improvements therein may be subsequently made by those skilled in the art, and those alternatives, modifications, variations, and/or improvements are intended to be encompassed by the following claims.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

The invention claimed is:

1. An apparatus for removing support material or resin from an additively manufactured part, comprising:
   an agitation chamber for containing a liquid formulation;
   a first draft tube located adjacent to the agitation chamber, said first draft tube comprising:
      a tubular body defining an internal passage having an inlet and an outlet;
      a mechanism operable for causing flow of the liquid formulation through the internal passage from the inlet to the outlet;
   wherein the outlet of the tubular body opens into the agitation chamber and is located to direct a flow along a side of the agitation chamber, whereby a vortex of the liquid formulation is caused to form in the agitation chamber;
   a wall separating the agitation chamber from an adjacent chamber, wherein the first draft tube is located in the adjacent chamber, wherein the outlet of the first draft tube is located in a lower portion of the wall, and further wherein the wall includes an opening located in an upper portion thereof; and
   a filter covering the opening, wherein the filter is sized to prevent particles entrained in the liquid formulation from passing through the opening.

2. The apparatus of claim 1 wherein the mechanism comprises an impeller located in the internal passage between the inlet and the outlet and a motor connected to the impeller.

3. The apparatus of claim 1 further comprising:
   at least one additional draft tube located adjacent to the agitation chamber and said first draft tube.

4. The apparatus of claim 1 wherein at least a portion of the internal passage of the first draft tube is comprised of multiple channels located in the internal passage between the mechanism and the outlet.

* * * * *